United States Patent
Fong et al.

(10) Patent No.: US 11,871,416 B2
(45) Date of Patent: Jan. 9, 2024

(54) MULTIPLEXING FORWARD AND REVERSE SIDELINK RESOURCE ALLOCATION FOR BIDIRECTIONAL COMMUNICATIONS

(71) Applicant: QUALCOMM Incorporated, San Diego, CA (US)

(72) Inventors: Lik Hang Silas Fong, Bridgewater, NJ (US); Chih-Hao Liu, San Diego, CA (US); Jing Sun, San Diego, CA (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 17/477,299

(22) Filed: Sep. 16, 2021

(65) Prior Publication Data
US 2023/0078193 A1    Mar. 16, 2023

(51) Int. Cl.
*H04W 72/20*    (2023.01)
*H04L 5/00*    (2006.01)
*H04W 72/044*    (2023.01)

(52) U.S. Cl.
CPC .......... *H04W 72/20* (2023.01); *H04L 5/0055* (2013.01); *H04W 72/044* (2013.01)

(58) Field of Classification Search
CPC .... H04W 72/20; H04W 72/044; H04L 5/0055
See application file for complete search history.

(56) References Cited

U.S. PATENT DOCUMENTS

| | | | | |
|---|---|---|---|---|
| 2019/0052436 A1* | 2/2019 | Desai | .................... | H04L 5/0055 |
| 2021/0219268 A1* | 7/2021 | Li | ........................ | H04W 72/20 |
| 2021/0297199 A1* | 9/2021 | Miao | ...................... | H04L 1/1896 |
| 2021/0306089 A1* | 9/2021 | Fehrenbach | .......... | H04L 1/0026 |
| 2021/0320759 A1* | 10/2021 | Lee | ........................ | H04L 1/1896 |
| 2022/0007403 A1* | 1/2022 | Li | .......................... | H04W 72/20 |
| 2022/0116950 A1* | 4/2022 | Zhao | .................... | H04W 72/542 |
| 2022/0272682 A1* | 8/2022 | Hahn | ........................ | H04L 5/00 |
| 2022/0337355 A1* | 10/2022 | Do | ........................ | H04L 5/0055 |
| 2023/0014893 A1* | 1/2023 | Zhang | .................... | H04W 24/08 |

(Continued)

FOREIGN PATENT DOCUMENTS

WO    WO-2016163972 A1    10/2016

OTHER PUBLICATIONS

International Search Report and Written Opinion—PCT/US2022/040751—ISA/EPO—dated Nov. 8, 2022.

*Primary Examiner* — Michael J Moore, Jr.
(74) *Attorney, Agent, or Firm* — Holland & Hart LLP/Qualcomm Incorporated

(57) ABSTRACT

Methods, systems, and devices for wireless communications are described. A first wireless device may receive sidelink control information from a second wireless device. The sidelink control information may include an allocation of a first set of resources for a sidelink transmission from the second wireless device to the first wireless device, along with an indication that schedules a second set of resources for additional sidelink transmissions between the first wireless device and the second wireless device that are scheduled to occur after the sidelink transmission from the second wireless device to the first wireless device. Based on the received indication, the first wireless device may communicate with the second wireless device via a sidelink shared channel using the first set of resources and the second set of resources.

30 Claims, 19 Drawing Sheets

(56) References Cited

U.S. PATENT DOCUMENTS

| | | | |
|---|---|---|---|
| 2023/0049344 A1* | 2/2023 | Choi .................... | H04B 17/318 |
| 2023/0078193 A1* | 3/2023 | Fong .................... | H04W 76/14 |
| | | | 370/329 |
| 2023/0171592 A1* | 6/2023 | Han ...................... | H04W 8/26 |
| | | | 370/328 |
| 2023/0180216 A1* | 6/2023 | Hwang ................ | H04W 72/25 |
| | | | 370/329 |
| 2023/0189294 A1* | 6/2023 | Dong .................... | H04W 72/25 |
| | | | 370/329 |
| 2023/0189301 A1* | 6/2023 | Zhao .................... | H04L 1/1607 |
| | | | 370/329 |
| 2023/0198685 A1* | 6/2023 | Loehr .................. | H04W 72/25 |
| | | | 370/329 |

* cited by examiner

MULTIPLEXING FORWARD AND REVERSE SIDELINK RESOURCE ALLOCATION FOR BIDIRECTIONAL COMMUNICATIONS

FIELD OF TECHNOLOGY

The following relates to wireless communications, including multiplexing forward and reverse sidelink resource allocation for bidirectional communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support sidelink communications between multiple devices to reduce latency and overall signaling overhead. In some systems, however, resource allocation techniques for sidelink communications may be deficient.

SUMMARY

The described techniques relate to improved methods, systems, devices, and apparatuses that support multiplexing forward and reverse sidelink resource allocation for bidirectional communications. Generally, the described techniques support enhanced sidelink resource allocation for both forward and reverse communications, for example, on a sidelink shared channel. In some sidelink communications systems, wireless devices may support a number of sidelink resource scheduling techniques to reserve and utilize sidelink resources (e.g., via a physical sidelink shared channel (PSSCH)) for both forward directions (e.g., from a second device to a first device) and also in reverse directions (e.g., from the first device to the second device). In some cases, the second device may include an explicit or implicit indication of future traffic directions in first sidelink control information (SCI 1) or second SCI (SCI 2), along with a resource allocation indicating resources that the first device may use to transmit feedback or other transmissions and retransmissions to the second device. The first device and the second device may also implement PSSCH resource block (RB) bundling techniques, where an indication in SCI 1 or SCI 2 may indicate bundles of PSSCH RBs to be used for the reverse transmissions on full slots and for mini-slots.

A method for wireless communications at a first wireless device is described. The method may include receiving, from a second wireless device, first SCI including an allocation of a first set of one or more resources for a sidelink transmission from the second wireless device to the first wireless device and an indication that schedules a second set of one or more resources for one or more additional sidelink transmissions between the first wireless device and the second wireless device, where the one or more additional sidelink transmissions are scheduled to occur after the sidelink transmission from the second wireless device to the first wireless device and communicating with the second wireless device via a sidelink shared channel using the first set of one or more resources and the second set of one or more resources based on the indication.

An apparatus for wireless communications at a first wireless device is described. The apparatus may include a processor, memory coupled with the processor, and instructions stored in the memory. The instructions may be executable by the processor to cause the apparatus to receive, from a second wireless device, first SCI including an allocation of a first set of one or more resources for a sidelink transmission from the second wireless device to the first wireless device and an indication that schedules a second set of one or more resources for one or more additional sidelink transmissions between the first wireless device and the second wireless device, where the one or more additional sidelink transmissions are scheduled to occur after the sidelink transmission from the second wireless device to the first wireless device and communicate with the second wireless device via a sidelink shared channel using the first set of one or more resources and the second set of one or more resources based on the indication.

Another apparatus for wireless communications at a first wireless device is described. The apparatus may include means for receiving, from a second wireless device, first SCI including an allocation of a first set of one or more resources for a sidelink transmission from the second wireless device to the first wireless device and an indication that schedules a second set of one or more resources for one or more additional sidelink transmissions between the first wireless device and the second wireless device, where the one or more additional sidelink transmissions are scheduled to occur after the sidelink transmission from the second wireless device to the first wireless device and means for communicating with the second wireless device via a sidelink shared channel using the first set of one or more resources and the second set of one or more resources based on the indication.

A non-transitory computer-readable medium storing code for wireless communications at a first wireless device is described. The code may include instructions executable by a processor to receive, from a second wireless device, first SCI including an allocation of a first set of one or more resources for a sidelink transmission from the second wireless device to the first wireless device and an indication that schedules a second set of one or more resources for one or more additional sidelink transmissions between the first wireless device and the second wireless device, where the one or more additional sidelink transmissions are scheduled to occur after the sidelink transmission from the second wireless device to the first wireless device and communicate with the second wireless device via a sidelink shared channel using the first set of one or more resources and the second set of one or more resources based on the indication.

Some examples of the method, apparatuses, and non-transitory computer-readable medium described herein may further include operations, features, means, or instructions for receiving a control message allocating the second set of one or more resources for the one or more additional sidelink transmissions, the one or more additional sidelink transmissions including sidelink transmissions from the first wireless device to the second wireless device, or sidelink transmissions from the second wireless device to the first wireless device, or any combination thereof.

In some examples of the method, apparatuses, and non-transitory computer-readable medium described herein, each of the one or more additional sidelink transmissions scheduled by the first SCI may be associated with a respective index value and the method, apparatuses, and non-transitory computer-readable medium may include further operations, features, means, or instructions for determining that a first sidelink transmission of the one or more additional sidelink transmissions may be scheduled as a sidelink transmission from the first wireless device to the second wireless device based on a first index value associated with the first sidelink transmission and determining that a second sidelink transmission of the one or more additional sidelink transmissions may be scheduled as another sidelink transmission from the second wireless device to the first wireless device based on a second index value associated with the second sidelink transmission, the second index value being different from the first index value.

In some examples of the method, apparatuses, and non-transitory computer-readable medium described herein, the first index value includes an even index value and the second index value includes an odd index value, or vice versa.

Some examples of the method, apparatuses, and non-transitory computer-readable medium described herein may further include operations, features, means, or instructions for determining that the one or more additional sidelink transmissions each include the sidelink transmissions from the first wireless device to the second wireless device based on the control message.

Some examples of the method, apparatuses, and non-transitory computer-readable medium described herein may further include operations, features, means, or instructions for receiving, within the first SCI, a communication direction indicator of whether the one or more additional sidelink transmissions may be scheduled as sidelink transmissions from the first wireless device to the second wireless device or sidelink transmissions from the second wireless device to the first wireless device and determining that the one or more additional sidelink transmissions include the sidelink transmissions from the first wireless device to the second wireless device, or the sidelink transmissions from the second wireless device to the first wireless device, or any combination thereof, based on the communication direction indicator.

Some examples of the method, apparatuses, and non-transitory computer-readable medium described herein may further include operations, features, means, or instructions for receiving second SCI from the second wireless device based on the first SCI, where the first SCI, or the second SCI, or any combination thereof, may have cyclic redundancy check (CRC) bits scrambled with a reverse sidelink radio network temporary identifier (RNTI) and determining that the one or more additional sidelink transmissions each include sidelink transmissions from the first wireless device to the second wireless device based on the reverse sidelink RNTI.

Some examples of the method, apparatuses, and non-transitory computer-readable medium described herein may further include operations, features, means, or instructions for receiving second SCI from the second wireless device based on the first SCI, where the first SCI, or the second SCI, or any combination thereof, may have CRC bits scrambled with an alternate sidelink RNTI that may be common to alternating sidelink transmissions and determining that the one or more additional sidelink transmissions may be scheduled to alternate between the sidelink transmissions from the first wireless device to the second wireless device and sidelink transmissions from the second wireless device to the first wireless device based on the alternate sidelink RNTI.

Some examples of the method, apparatuses, and non-transitory computer-readable medium described herein may further include operations, features, means, or instructions for receiving second SCI from the second wireless device based on the first SCI, where respective bits in the second SCI correspond to either sidelink transmissions from the first wireless device to the second wireless device or sidelink transmissions from the second wireless device to the first wireless device, and where a number of the respective bits corresponds to a number of the one or more additional sidelink transmissions.

Some examples of the method, apparatuses, and non-transitory computer-readable medium described herein may further include operations, features, means, or instructions for receiving, within the first SCI or second SCI associated with the first SCI, a retransmission indicator associated with one or more retransmissions from the first wireless device to the second wireless device, identifying a retransmission request based on the retransmission indicator indicating a request to transmit the one or more retransmissions to the second wireless device, and transmitting the one or more retransmissions using the second set of one or more resources based on the retransmission request.

In some examples of the method, apparatuses, and non-transitory computer-readable medium described herein, the retransmission indicator includes a first bit in the first SCI, a second bit in the second SCI, an implicit indication in a time and frequency resource allocation field of the first SCI, or any combination thereof.

Some examples of the method, apparatuses, and non-transitory computer-readable medium described herein may further include operations, features, means, or instructions for receiving control signaling indicating one or more partitions for the first set of one or more resources and the second set of one or more resources, the one or more partitions including uniform partitions within a transmission time interval, or non-uniform partitions within the transmission time interval, or any combination thereof, where each partition of the one or more partitions may be associated with respective SCI transmissions.

In some examples of the method, apparatuses, and non-transitory computer-readable medium described herein, the first SCI may be associated with a partition of a transmission time interval and the method, apparatuses, and non-transitory computer-readable medium may include further operations, features, means, or instructions for receiving, within the first SCI, a time indicator that indicates a respective time offset between each of the one or more additional sidelink transmissions, the respective time offset including a quantity of mini-slots, or a quantity of symbol periods, or any combination thereof and receiving, within the first SCI, a frequency indicator that indicates a respective frequency offset between sequential sidelink transmissions of the one or more additional sidelink transmissions.

Some examples of the method, apparatuses, and non-transitory computer-readable medium described herein may further include operations, features, means, or instructions for identifying a RB bundling indicator indicating one or more sidelink shared channels within a transmission time interval to use for retransmissions from the first wireless device to the second wireless device, where the RB bundling indicator may be configured, or includes a first bitmap included in the first SCI, or a second bitmap included in second SCI, or any combination thereof and mapping one or more sidelink transmissions from the first wireless device to the second wireless device to one or more sets of RBs in the transmission time interval based on the RB bundling indicator.

In some examples of the method, apparatuses, and non-transitory computer-readable medium described herein, the RB bundling indicator further indicates a number of resources of the second set of one or more resources in a same mini-slot that may be bundled together for transmissions in a frequency domain.

In some examples of the method, apparatuses, and non-transitory computer-readable medium described herein, the RB bundling indicator further indicates transmission time interval bundling in which a number of resources of the second set of one or more resources occupy a same sub-channel and span a threshold number of RBs that may be bundled together in a same mini-slot.

Some examples of the method, apparatuses, and non-transitory computer-readable medium described herein may further include operations, features, means, or instructions for applying the RB bundling indicator with an additional indicator for identifying a number of repetitions of bundled consecutive RBs in a mini-slot and transmitting, based on the RB bundling indicator and the additional indicator, a number of repetitions of the bundled consecutive RBs that may be allocated for sidelink transmission from the first wireless device to the second wireless device in a time domain, a frequency domain, or both.

Some examples of the method, apparatuses, and non-transitory computer-readable medium described herein may further include operations, features, means, or instructions for mapping sidelink transmissions from the first wireless device to the second wireless device to a gap symbols between sets of consecutive RBs in a mini-slot based on the RB bundling indicator.

Some examples of the method, apparatuses, and non-transitory computer-readable medium described herein may further include operations, features, means, or instructions for receiving, from the second wireless device, a first sidelink message on the first set of one or more resources, where the first sidelink message may be received over at least one mini-slot, generating a feedback message based on decoding the first sidelink message from the second wireless device, and transmitting, in one or more fields of second SCI over the sidelink control channel, the feedback message to the second wireless device.

In some examples of the method, apparatuses, and non-transitory computer-readable medium described herein, the feedback message includes a set of multiple bits corresponding to a request for additional resources for one or more retransmissions, or an initial transmission, or any combination thereof, of a sidelink message from the second wireless device to the first wireless device.

In some examples of the method, apparatuses, and non-transitory computer-readable medium described herein, the feedback message includes a concatenation of a set of multiple bits that each correspond to an acknowledgement or negative acknowledgement of the first sidelink message for each mini-slot of the set of multiple mini-slots and the feedback message includes combined feedback for the set of multiple mini-slots corresponding to the acknowledgement or the negative acknowledgement of the first sidelink message.

Some examples of the method, apparatuses, and non-transitory computer-readable medium described herein may further include operations, features, means, or instructions for identifying an absence of sidelink data to transmit in the second SCI and transmitting the feedback message within the second SCI including one or more padding bits, a no-data indicator, or both, based on the absence of sidelink data.

In some examples of the method, apparatuses, and non-transitory computer-readable medium described herein, the one or more fields of the second SCI includes a frequency domain resource allocation field (FDRA), a time domain resource allocation field (TDRA), or any combination thereof.

Some examples of the method, apparatuses, and non-transitory computer-readable medium described herein may further include operations, features, means, or instructions for transmitting a feedback indicator within the second SCI based on generating the feedback message, the feedback indicator indicating an absence of a resource reservation in the second SCI and that the one or more fields of the second SCI include the feedback message.

Some examples of the method, apparatuses, and non-transitory computer-readable medium described herein may further include operations, features, means, or instructions for scrambling a set of multiple CRC bits of the second SCI using a RNTI associated with a replacement of a resource assignment with feedback, the RNTI being common among a set of multiple wireless devices including the first wireless device, and where the RNTI includes the feedback indicator.

In some examples of the method, apparatuses, and non-transitory computer-readable medium described herein, the feedback indicator includes a first bit present in at least one of the one or more fields of the second SCI and a remaining number of bits in each of the one or more fields may be associated with allocating sets of one or more resources for subsequent sidelink transmissions, one or more additional feedback messages, or any combination thereof.

DETAILED DESCRIPTION

Figure 1:
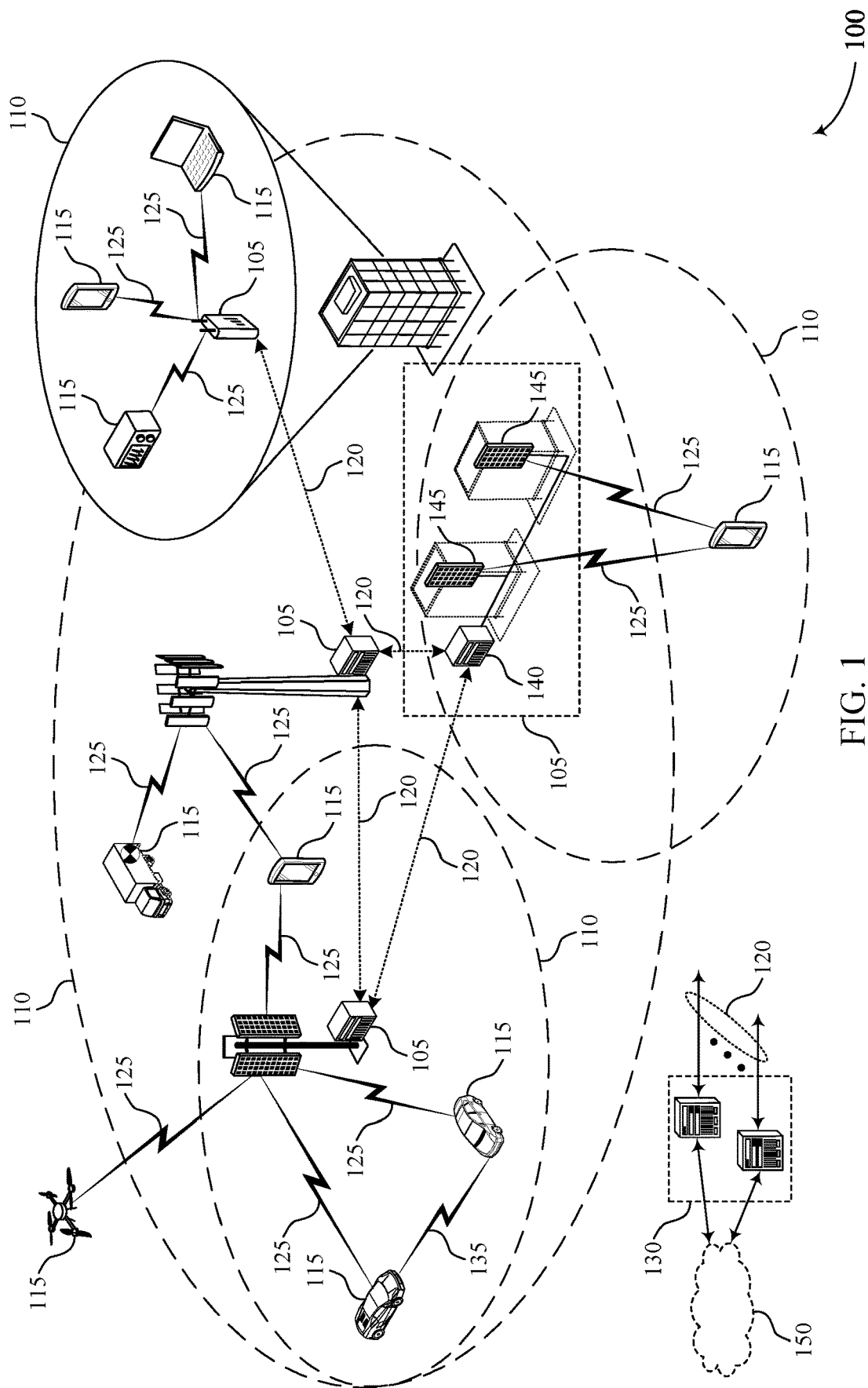
FIG. 1 illustrates an example of a wireless communications system that supports multiplexing forward and reverse sidelink resource allocation for bidirectional communications in accordance with aspects of the present disclosure.

Some wireless communications systems may be deployed in a factory environment and may include base stations and one or more wireless devices (e.g., programmable logic controllers (PLCs), sensors, actuators, and combined sensors and actuators). The term S/A may be used to broadly refer to sensors, actuators, and combined sensors/actuators. Wireless devices may communicate directly with one another over resources (which may be referred to as sidelink communication resources) that are reserved by a base station for direct communications between the wireless devices. In some examples, a transmitting device (e.g., a PLC) may be configured to schedule communications between the transmitting device and one or more receiving devices (e.g., one or more S/As) over the sidelink communication resources. Transmissions from the one or more receiving devices to the transmitting device may be referred to as reverse sidelink transmissions. Similarly, transmissions from the transmitting device to the one or more receiving devices may be referred to as forward sidelink transmissions.

Thus, wireless communications systems may support sidelink communications between one or more wireless device to reduce latency and overall signaling overhead. In some cases, such as for industrial internet of things (IoT) deployments and factory automation or vehicle to vehicle systems, sidelink communications may include cyclic exchanges of mission critical data between devices. Such communications may have relatively stringent latency and reliability targets in order to maintain communications quality. In some implementations, a wireless device such as a programmable logic controller (PLC) or a UE may schedule sidelink communications on a sidelink shared channel via a resource allocation indicated on a sidelink control channel, for example using sidelink control information (SCI). In some cases, however, resource allocation on the sidelink control channel may be associated with unidirectional traffic (e.g., from the transmitting device to the receiving device), which may reduce the flexibility for transmitting feedback on the sidelink control channel and otherwise increase latency for sidelink communications.

To increase resource scheduling efficiency and overall communications quality, the wireless communications system may support a number of different sidelink scheduling techniques allowing sidelink resources (e.g., via a physical sidelink shared channel (PSSCH)) to be reserved by a device for both forward directions (e.g., from a PLC to a UE, from a PLC to an S/A) and also in reverse directions (e.g., from the UE to the PLC, from the S/A to the PLC). In some cases, the PLC may include an explicit or implicit indication of future traffic directions in first SCI (SCI 1) or second SCI (SCI 2), along with a resource allocation indicating resources that the UE may use to transmit feedback or other transmissions and retransmissions to the PLC. In some cases, the directions of transmissions may be configured via radio resource control (RRC) or higher layers or scheduled by the PLC.

Additionally or alternatively, the PLC and UE may implement PSSCH resource block (RB) bundling techniques, where an indication in SCI 1 or SCI 2 may indicate bundles of PSSCH RBs to be used for the reverse transmissions. In addition, the resource allocation and PSSCH RB bundling may apply for full slots and for mini-slots, where the indication in SCI 1 or SCI 2 may indicate how many neighboring PSSCHs in the same slot or mini-slot are bundled together for reverse transmissions.

Scheduling reverse sidelink transmissions on the PSSCH may increase communications reliability for transmitting feedback and retransmissions as opposed to transmitting feedback on a sidelink feedback channel. In addition, scheduling reverse transmissions on the PSSCH may reduce latency for transmissions and retransmissions, and may support efficient sidelink communications between devices in the wireless system. Thus, the described techniques may enable improved communications efficiency, increased throughput, and relatively high reliability, among other benefits.

Aspects of the disclosure are initially described in the context of wireless communications systems. Further examples of resource allocations for forward and reverse sidelink transmissions are provided. Aspects of the disclosure are further illustrated by and described with reference to apparatus diagrams, system diagrams, sidelink resource allocation configurations, a process flow, and flowcharts that relate to multiplexing forward and reverse sidelink resource allocation for bidirectional communications.

FIG. 1 illustrates an example of a wireless communications system 100 that supports multiplexing forward and reverse sidelink resource allocation for bidirectional communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of one or more radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of one or more of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, wireless communications system 100 may be an example of an IoT system, a V2X system, or other system which uses sidelink communications. Such sidelink communications may operate using stringent latency and reliability targets. In some implementations, a wireless device such as UE 115 or a PLC may schedule sidelink communications on a sidelink shared channel via resource allocation indicated on a sidelink control channel, for example using SCI. In some cases, however, such resource allocation may be for unidirectional traffic, which may increase latency for sidelink communications.

To increase resource scheduling efficiency and overall communications quality, the wireless devices of wireless communications system 100 may support a number of different sidelink scheduling techniques to reserve and utilize sidelink resources (e.g., via a PSSCH) for both forward directions (e.g., from a transmitting device to a receiving device, such as from a PLC to a UE 115) and also in reverse directions (e.g., from a receiving device to a transmitting device, such as from the UE 115 to the PLC). In some cases, the PLC may include an explicit or implicit indication of future traffic directions in first SCI (SCI 1) or second SCI (SCI 2), and a resource allocation indicating resources that the UE 115 may use to transmit feedback or other transmissions and retransmissions to the PLC. The PLC and UE may implement PSSCH RB bundling techniques, where an indication in SCI 1 or SCI 2 may indicate bundles of PSSCH RBs to be used for the reverse transmissions on full slots and for mini-slots.

Figure 2:
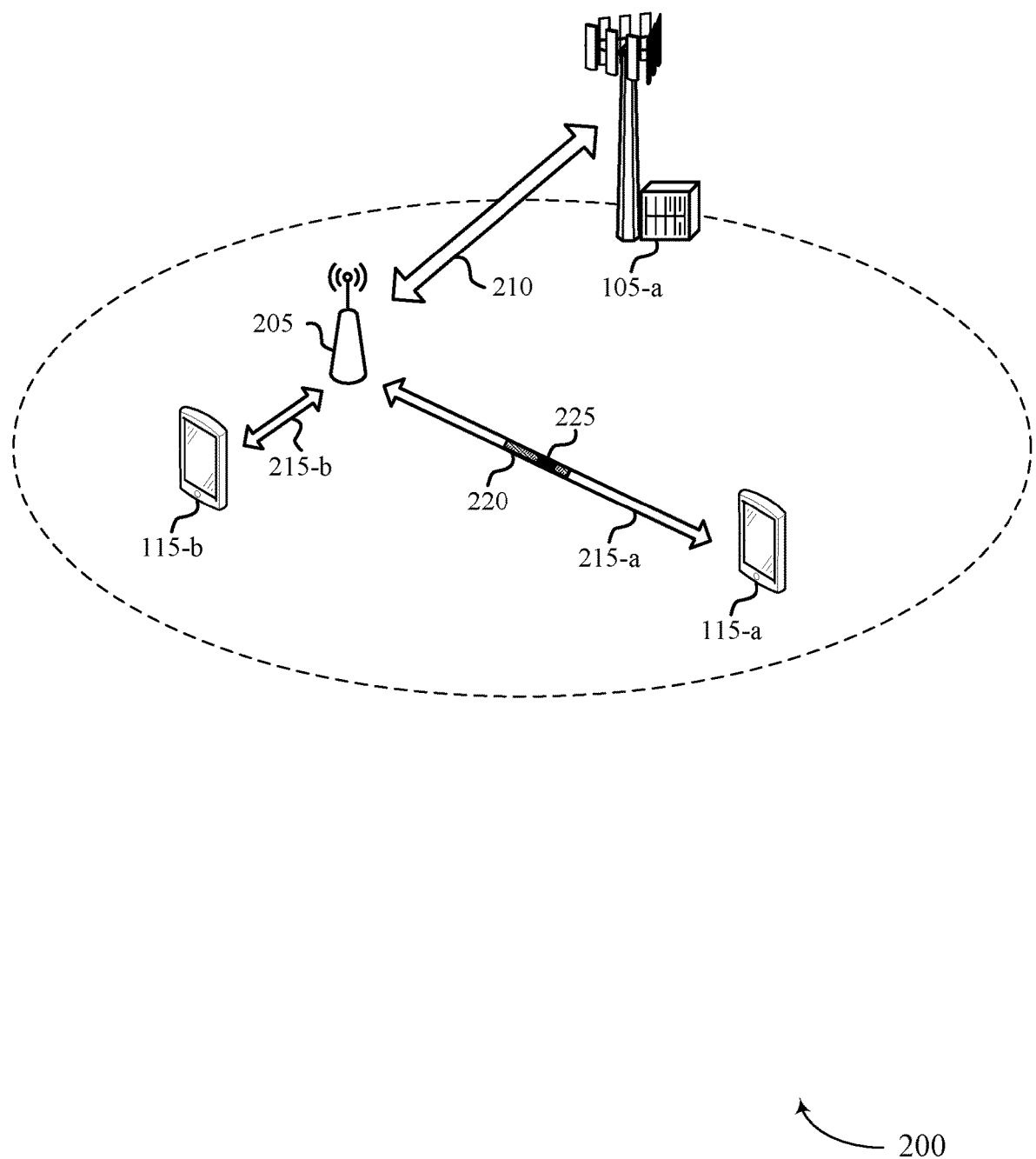
FIG. 2 illustrates an example of a wireless communications system that supports multiplexing forward and reverse sidelink resource allocation for bidirectional communications in accordance with aspects of the present disclosure.

FIG. 2 illustrates an example of a wireless communications system 200 that supports multiplexing forward and reverse sidelink resource allocation for bidirectional communications in accordance with aspects of the present disclosure. In some examples, wireless communications system 200 may implement aspects of wireless communications system 100. The wireless communications system 200 may include a first UE 115-a, a second UE 115-b, a PLC 205, and a base station 105-a, which may be examples of UEs 115 and base stations 105 as described with reference to FIG. 1.

In some cases, wireless communications system 200 may be implemented as a wireless factory automation system or other system involving cyclic exchanges of data between devices. For example, the communications between devices may be mission critical (e.g., deterministic and periodic), and may be associated with stringent latency and reliability targets (e.g., with latency≈1-2 ms and reliability≈$10^{-6}$). In such examples, both data channels and control channels may be configured to support low latency and high reliability for sidelink communications.

In the context of a wireless factory automation system (e.g., wireless communications system 200), the base station 105-a may be mounted on a ceiling of a factory such that it may communicate with various wireless devices (e.g., first UE 115-a and second UE 115-b) within the factory. In some cases, a wireless PLC 205 may communicate with the first UE 115-a and the second UE 115-b, which may include a wireless sensor/actuator (S/A). In some implementations, the PLC 205 may communicate with the base station 105-a via a direct link or a Uu link (e.g., communication link 210), and the UEs 115-a and 115-b may communicate with the PLC 205 via a PC5 link (e.g., communication links 215-a and 215-b). In some cases, the communications between devices may be associated with relatively small application layer payloads (e.g., ≈40-256 bytes) to reduce overall signaling overhead.

In this example, the PLC 205 may be mounted close to machinery and may be configured to communicate with a set of one or more S/As (e.g., UEs 115-a and UE 115-b) or other wireless devices via one or more sidelinks (e.g., sidelink communication links). In some cases, a single factory may include 100-1000 PLCs, and each PLC may be communicatively coupled to 20-50 S/As. The various wireless devices within a factory may exhibit varying complexity or sophistication. For example, the first UE 115-a (e.g., PLC) may include a higher-complexity wireless device as compared to the UEs 115-a and 115-b (e.g., an S/A) which may include a relatively lower-complexity wireless device. The term "higher-complexity device" may be used to refer to a wireless device which exhibits superior processing capabilities, superior channel knowledge of channels within the wireless communications system 200, or both, as compared to a "lower-complexity device." In some examples, the PLC 205 may have a wired or direct connection with the base station 105-a. In some other cases, the PLC 205 may have a wireless connection with devices in wireless communications system 200, which may reduce reconfiguration costs in the system.

The first UE 115-a and the second UE 115-b may communicate with the PLC 205 using a communication link 215-a and a communication link 215-b, respectively, which may be examples of wireless links between the UEs 115 and the PLC 205. In some examples, the UEs 115-a and 115-b may establish a direct link with the base station 105-a, or the UEs 115-a and 115-b may communicate with the PLC 205, which may communicate with the base station 105-a via communication link 210. In some cases, the communication link 210 may be a bi-directional link that enables both uplink and downlink communication. For example, the PLC 205 may transmit uplink signals, such as uplink control signals or uplink data signals, to the base station 105-a using the communication link 210 and the base station 105-a may transmit downlink signals, such as downlink control signals or downlink data signals, to the PLC 205 using the communication link 210. The first UE 115-a and the second UE 115-b may communicate with one another via a sidelink communication link, or the first UE 115-a and the second UE 115-b may communicate with the PLC 205 using respective communication links 215-a and 215-b. In some cases, the communication link 215-a and 215-b may be an example of a link between two UEs 115 (e.g., a sidelink communication link, a PC5 link).

In some aspects, the communication links 215-a and 215-b (e.g., sidelink communication links) may be included within a sidelink network of the wireless communications system 200. The sidelink network (e.g., sidelink network including the communication links 215-a and 215-b) may be configurable to operate in a "Mode 1" (e.g., V2X mode 1) or a "Mode 2" (e.g., V2X mode 2). While operating in Mode 1, the sidelink network (e.g., communication links 215-a and 215-b, or sidelink communication link) may be managed (e.g., coordinated or scheduled) by the base station 105-a. In this regard, during Mode 1 operation, the base station 105-a may manage resource allocation such as the scheduling of sidelink resources for communications between the PLC 205 and the UEs 115-a and 115-b. In some cases, the base station 105-a may implement Mode 1 scheduling processes using control signaling such as RRC signaling or downlink control information (DCI) signaling (e.g., DCI 3_0).

For example, during Mode 1 operation, the base station 105-a may schedule sidelink resources by transmitting grants (e.g., dynamic grants, configured grants) to the PLC 205 or to each of the first UE 115-a and the second UE 115-b. For instance, the first UE 115-a and the second UE 115-b may be configured to perform sidelink transmissions using a configured grant, which may be activated via RRC signaling from the base station 105-a. In some other examples, the base station 105-a may schedule sidelink transmissions via DCI, where the DCI includes a dynamic grant which indicates sidelink resources for sidelink transmissions. In some cases, the first UE 115-a and the second UE 115-b may report activation or deactivation of a grant (e.g., configured grant, dynamic grant) by transmitting MAC-CE messages to the base station 105-a.

Operating the sidelink communication link (e.g., communication link 210) according to Mode 1 may allow for the base station 105-a to coordinate and manage sidelink communications. In some other cases, however, the wireless communications system may operate the sidelink communication links according to Mode 2, and the sidelink network (e.g., communication links 215-a and 215-b, or sidelink communication links) may be managed independently from the base station 105-a. Without coordination or management of the resources of the sidelink network during the Mode 2 operation, the PLC 205 and the UEs 115 (e.g., first UE 115-a, second UE 115-b, additional UEs 115) of the wireless communications system 200 may follow contention-based access procedures in which the various UEs 115 may "compete" for the use of the sidelink network. For example, during Mode 2 operation, the first UE 115-a and the second UE 115-b may monitor the sidelink network of the wireless communications system 200 to determine if other UEs 115 are attempting to transmit over the sidelink network. For instance, the first UE 115-a and the second UE 115-b may monitor the sidelink network for transmissions (e.g., SCI 0-1, request-to-send messages) transmitted by other UEs 115, and may transmit messages (e.g., SCI 0-1, request-to-send messages) to compete for the use of the sidelink network (e.g., communication link 210).

However, in the context of Mode 2 sidelink operation, each of the first UE 115-a and the second UE 115-a may monitor the sidelink network in order to schedule their own sidelink transmissions. For example, one of the UEs 115-a or 115-b may identify one or more sidelink transmission resources within a pool of sidelink resources configured by base station 105-a or using pre-configured sidelink resources. In some cases, a transmitting UE may sense and select resources based on a first format of SCI (SCI 1) and based on the reference signal receive power (RSRP) measurements of demodulation reference signal (DMRS) of the physical sidelink shared channel (PSSCH) or physical sidelink control channel (PSCCH). The transmitting UE may use SCI 1 in the PSCCH and a second SCI format (SCI 2) in PSSCH to schedule and transmit the data inside PSSCH in a unicast, groupcast, or broadcast transmission. Upon receiving each transmission from the transmitting UE, a receiving UE may transmit a feedback message (e.g., an acknowledgement/negative acknowledgement (ACK/NACK)) on a sidelink feedback channel (e.g., the physical sidelink feedback channel (PSFCH)). In some examples, the feedback may be an explicit ACK/NACK (e.g., for unicast and groupcast transmissions) or the feedback may be an implicit NACK (e.g., for some groupcast transmissions).

A UE may use SCI 1 in the PSCCH to reserve resources for a current sidelink transmission and for future transmissions (e.g., up to two future transmissions) and the reservations may be for a same number of subchannels, although the starting subchannel may differ between reservations of sidelink transmissions. In some cases, however, resource allocation in SCI 1 may be for unidirectional traffic between devices (e.g., between a UE (e.g., UE 115-a or UE 115-b) and the PLC 205, or vice versa). For example, the PLC 205 may schedule a transmission from one of the UEs 115-a or 115-b to the PLC 205 on the PSSCH, and an associated feedback transmission may be scheduled on the PSFCH. The PSFCH, however, may not be as reliable as the transmissions using the PSCCH.

As described herein, the wireless communications system 200 may support various techniques for allocating sidelink transmissions using an indication 225 in an SCI transmission 220 (e.g., SCI 1). For example, the indication 225 in SCI 1 may denote one or more resource allocations for both the forward and reverse sidelink traffic to indicate bidirectional traffic on the sidelink channel. In such cases, the PLC 205 may allocate future transmissions on the PSCCH (e.g., "forward" transmissions) from the PLC 205 to the UEs 115-a or 115-b, and future transmissions on the PSCCH from the UEs 115-a and 115-b to the PLC 205 (e.g., "reverse" transmissions). For example, some reverse transmissions may include retransmissions, and the PLC 205 may include a retransmission indicator in SCI 1 in cases where it requests a retransmission from the UE 115-a or 115-b.

In some examples, the PLC 205 may allocate sidelink transmissions on slots of the sidelink channel or mini-slots, where each slot may include, for example, two or three mini-slots. In such examples, the use of mini-slots may reduce latency between the resource allocation and sidelink transmission, and may reduce the number of RBs used for padding (e.g., in cases where the PLC 205 does not have forward traffic but schedules reverse traffic, the PLC 205 may use fewer RBs to pad the empty forward transmissions).

In some other examples, while operating in mode 1, the UE 115-a or 115-b may determine that it does not have sidelink transmissions to schedule in a future sidelink transmission such that the frequency division resource allocation (FDRA) and time division resource allocation (TDRA) fields in every PSCCH sent by UE 115 are left unused. The TDRA and FDRA fields may be useful for the PLC 205 to reserve reverse sidelink traffic, so instead of removing the fields, the UE 115-a or 115-b may repurpose the fields for sending HARQ feedback information. For example, the UE 115-a or 115-b may transmit ACK/NACK to the PLC 205 using the PSCCH rather than the PSFCH, which may increase reliability of the feedback transmission (e.g., PSFCH resources may not be used for sidelink feedback from the UEs 115-a and 115-b to the PLC 205).

By allocating both forward and reverse sidelink communications directions for the PSCCH, the PLC may effectively increase the reliability of retransmissions and feedback messages, and may decrease latency associated with reverse traffic directions on the sidelink channel. In addition, the scheduling of forward and reverse sidelink communications directions via an indication in SCI may allow for wireless devices to more flexible schedule communications on the sidelink channel without use of the PSFCH.

Figure 3:
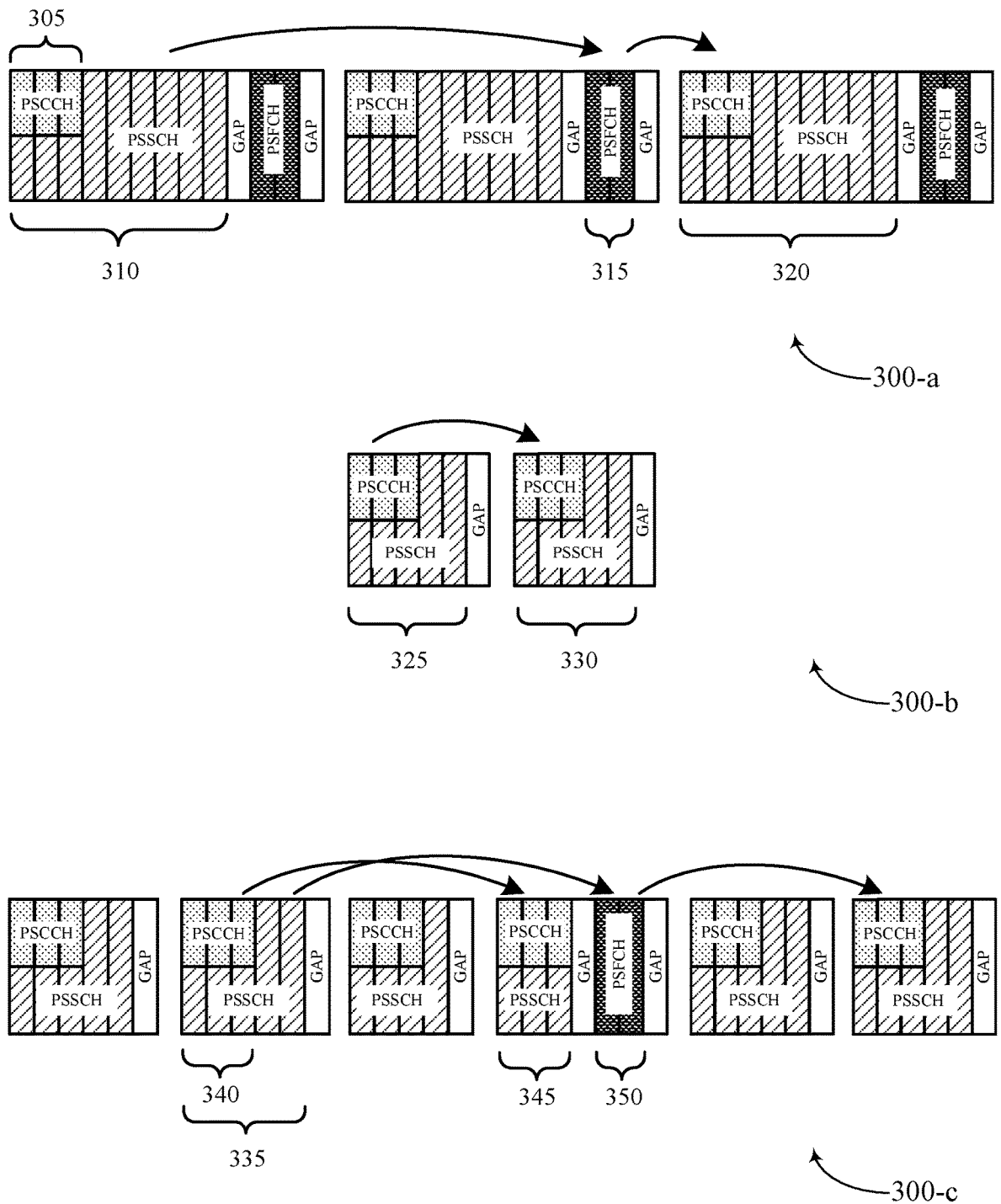
FIGS. 3 through 7 illustrate examples of sidelink resource allocation configurations that support multiplexing forward and reverse sidelink resource allocation for bidirectional communications in accordance with aspects of the present disclosure.

FIG. 3 illustrates an example of sidelink resource allocation configurations 300 (e.g., sidelink resource allocation configuration 300-a, sidelink resource allocation configuration 300-b, sidelink resource allocation configuration 300-c) that support multiplexing forward and reverse sidelink resource allocation for bidirectional communications in accordance with aspects of the present disclosure. For example, the sidelink resource configurations 300-a, 300-b, and 300-c, may be implemented at or by a wireless device such as a PLC or UE (e.g., S/A) as described with reference to FIGS. 1 and 2. Additionally or alternatively, the sidelink configurations 300 may be configured by a PLC or a base station described with reference to FIGS. 1 and 2.

The sidelink resource allocation configurations 300 may include a number of RBs, which may be further grouped into sub-channels, a device may use to transmit data and control information via the PSCCH and PSSCH. For example, data may be allocated to a number of transport blocks (TBs) including packets that are carried in the PSSCH. A TB can occupy one or several sub-channels depending on the size of the packet, the number of RBs per sub-channel, and the utilized Modulation and Coding Scheme (MCS). Each TB may have an associated SCI message carried in the PSCCH. In some examples, the SCI may be referred to as a scheduling assignment or a resource assignment, and may be of a first format (e.g., SCI 1) or a second format (e.g., SCI 2). In addition, a PSFCH may be included for some transmissions of feedback information. A gap period may be included between transmissions of the PSSCH.

Sidelink resource allocation configuration 300-a shows a unidirectional resource allocation scheme in which a UE may use resources of the PSFCH to transmit sidelink feedback to a PLC. For example, a PLC may use SCI 1 in the PSCCH 305 to reserve resources for a current sidelink transmission and for future sidelink transmission. The PLC may transmit the sidelink transmission to the UE using resources of the PSSCH 310, and an indication of resources of the PSFCH 315 for the UE to use for transmitting a feedback transmission associated with the transmission of the PSSCH 310. In some cases, the UE may transmit feedback using the PSFCH 315, and based on the content of the PSFCH 315 (e.g., if the transmission of PSFCH 315 includes a NACK or a retransmission request), the UE or PLC may schedule a retransmission on PSSCH 320.

Sidelink resource allocation configuration 300-b shows a unidirectional resource allocation scheme using mini-slots. In the example of sidelink resource allocation configuration 300-b, a PLC may transmit PSCCH and PSSCH 325 to a UE. After a gap period, the UE may transmit a retransmission or a new transmission to the PLC using PSSCH resources 330.

Sidelink resource allocation configuration 300-c shows a bidirectional resource allocation scheme using mini-slots in accordance with aspects of the present disclosure. In 300-b, a PLC may transmit a first transmission to the UE using sidelink resources of the PSSCH 335. In some cases, the first transmission may include an indication of feedback resources (e.g., PSSCH-to-feedback) of the PSFCH 350 to use for transmitting feedback to the PLC. The UE may transmit feedback (e.g., a NACK) using the PSFCH resource. In some other cases, the PLC may transmit a transmission to the UE using sidelink resources of the PSCCH 340 which includes a resource assignment for a reverse transmission from the UE to the PLC during PSSCH 345.

Figure 4:
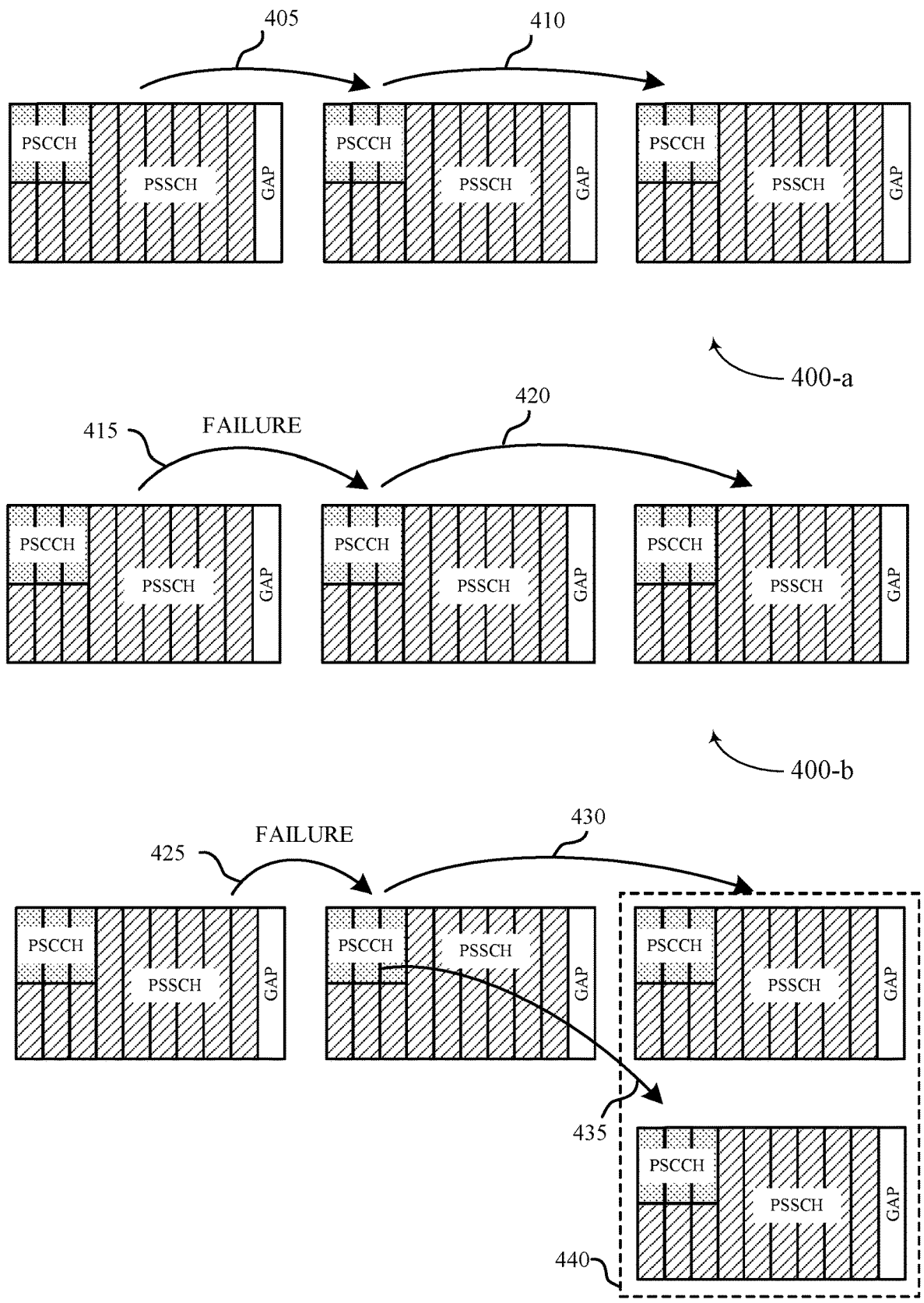

FIG. 4 illustrates an example of sidelink resource allocation configurations 400 (e.g., sidelink resource allocation configuration 400-a, sidelink resource allocation configuration 400-b, sidelink resource allocation configuration 400-c) that support multiplexing forward and reverse sidelink resource allocation for bidirectional communications in accordance with aspects of the present disclosure. For example, the sidelink resource configurations 400-a, 400-b, and 400-c, may be implemented at or by a wireless device such as a PLC or UE (e.g., S/A) as described with reference to FIGS. 1 and 2. Additionally or alternatively, the sidelink configurations 400 may be configured by a PLC or a base station described with reference to FIGS. 1 and 2.

The sidelink resource allocation configurations 400 may include a number of RBs which may be further grouped into sub-channels, a device may use to transmit data and control information via the PSCCH and PSSCH. For example, data may be allocated to a number of TBs including packets that are carried in the PSSCH. A TB can occupy one or several sub-channels depending on the size of the packet, the number of RBs per sub-channel, and the utilized MCS. Each TB has an associated SCI message that is carried in the PSCCH. In some examples, the SCI may be referred to as a scheduling assignment or a resource assignment, and may be of a first format (e.g., SCI 1) or a second format (e.g., SCI 2). In addition, a PSFCH may be included for some transmissions of feedback information. A gap period may be included between transmissions of the PSSCH.

In sidelink resource configuration 400-a, a PLC may allocate resources for future transmissions in forward directions (e.g., from the PLC to a UE or S/A) and reverse directions (e.g., from the UE or S/A to the PLC) via the PSCCH (e.g., via SCI). At 405, the UE may transmit a first transmission to the PLC. At 410, the PLC may transmit PSCCH and PSSCH to the UE, including an indication of future transmissions in forward and reverse directions via the PSCCH. Based on the indication in the PSCCH, the UE may perform a retransmission or a send a new transmission to the PLC.

The PLC may convey different directions of future transmissions in PSCCH using a number of different techniques. In a first implementation, the future traffic directions may be configured through RRC signaling or other higher layer signaling. For example, if the PLC allocates a number (e.g., N) future transmissions with indices equal to 1, 2, . . . , N, then transmissions with odd indices may be allocated to the reverse direction and transmissions with even indices are allocated to the forward direction. In some other cases, all future resources may be allocated to the reverse direction (e.g., from the UE to the PLC).

In some other implementations, the PLC may provide an explicit direction indicator in SCI 1 or SCI 2 to specify the directions of the future reservations. For example, if all future reserved transmissions are in the reverse direction or alternate from the forward direction to the reverse direction, then the PLC may provide one or more sidelink radio network temporary identifiers (SL-RNTIs) to indicate the directions. For example, a reverse-SL-RA-RNTI or an alternate-SL-RA-RNTI may be used to scramble the CRC of SCI 1 or the CRC SCI 2, or both. The reverse-SL-RA-RNTI or alternate-SL-RA-RNTI may be configured and may be common to reverse-link or alternate-link reservations such that the UE may identify the future transmission directions.

In such cases that the UE is operating using mode 2 sidelink, the UE may decode SCI 1 based on the radio network temporary identifier (RNTI), and may obtain the resource reservation information (e.g., even in cases that the UE may not be able to decode SCI 2). In mode 2, the UE may decode the priority field in SCI 1 which may be associated with future reservations.

In some other implementations, the PLC may include N bits in SCI 2 to indicate the directions (e.g., forward or reverse) of the N future reserved transmissions. In some other cases, the indication of the communication direction may include a retransmission (ReTx) indicator that the PLC may transmit to one or more UEs. For example, the PLC may include the ReTx indicator for each reserved transmission in the reverse direction with transmissions of SCI 1 or SCI 2.

In some examples, the PLC may include an explicit bit in SCI 1 or SCI 2 which indicates whether retransmission is requested. For example, the PLC may include a bit in the time and frequency resource allocation field in SCI 1 may be repurposed to include retransmission request, and the remaining bits of the SCI 1 may be used for a future reservation in the reverse direction.

In some other implementations, the PLC may include an implicit indication contained inside time and frequency resource allocation field in SCI 1. For example, if the resource allocation includes more than a single transmission in the reverse direction, then retransmission may be assumed to be requested for all reverse traffic. In such cases, the PLC may preempt the remaining unused retransmissions resources via other SCI-1 messages if a retransmission is successful. In cases that the PLC does not have PSSCH data but still allocates bidirectional resources, the PLC may transmit padding bits.

In sidelink resource configuration 400-b, the PLC may allocate resources for future transmissions in forward directions (e.g., from the PLC to a UE or S/A) and reverse directions (e.g., from the UE or S/A to the PLC) without allocating future resources via resources of the PSCCH. At 415, the UE may transmit a first transmission to the PLC, and in some cases, the transmission 415 may fail, or the PLC may unsuccessfully decode PSSCH. At 420, the PLC may transmit a first transmission to the UE which may include a future sidelink resource assignment for retransmission in SCI 1 together with a retransmission request through a retransmission indicator in SCI 1 or SCI 2. The UE may perform a retransmission on the resources allocated by the PLC.

In the sidelink resource configuration 400-c, the PLC may include a PSSCH RB bundling indicator to indicate how many neighboring PSSCHs in the same slot may be bundled together for each future reservation. At 425, the UE may transmit a first transmission to the PLC, and in some cases, the transmission 425 may fail, or the PLC may unsuccessfully decode PSSCH. At 430 and 435, the PLC may transmit a first and second transmission to the UE on a PSSCH resource bundle 440 which may include a future sidelink resource assignment for retransmission in SCI 1 or SCI 2. The UE may perform a retransmission on the resources allocated by the PLC. In some cases, the PLC may transmit the PSSCH RB bundling indicator via SCI 1 or SCI 2, where the corresponding bitmap may be configured or configured by RRC signaling or higher layers. For example, a bitmap value of 00 may correspond to a single PSSCH RB per bundle, a bitmap value of 01 may correspond to two PSSCH RBs per bundle (e.g., illustrated by resource bundle 440), a bitmap value of 10 may correspond to four PSSCH RBs per bundle, and a bitmap value of 11 may correspond to eight PSSCH RBs per bundle. Additionally or alternatively, different bitmap values may correspond to different PSSCH RBs per bundle. In some other implementations, the PSSCH RB bundling indicator may be configured by RRC or higher layer signaling. Retransmitting a TB across multiple PSSCHs in the same slot (e.g., PSSCH RB bundling), may improve reliability for low latency and high reliability transmissions such as those associated with URLLC traffic.

Figure 5:
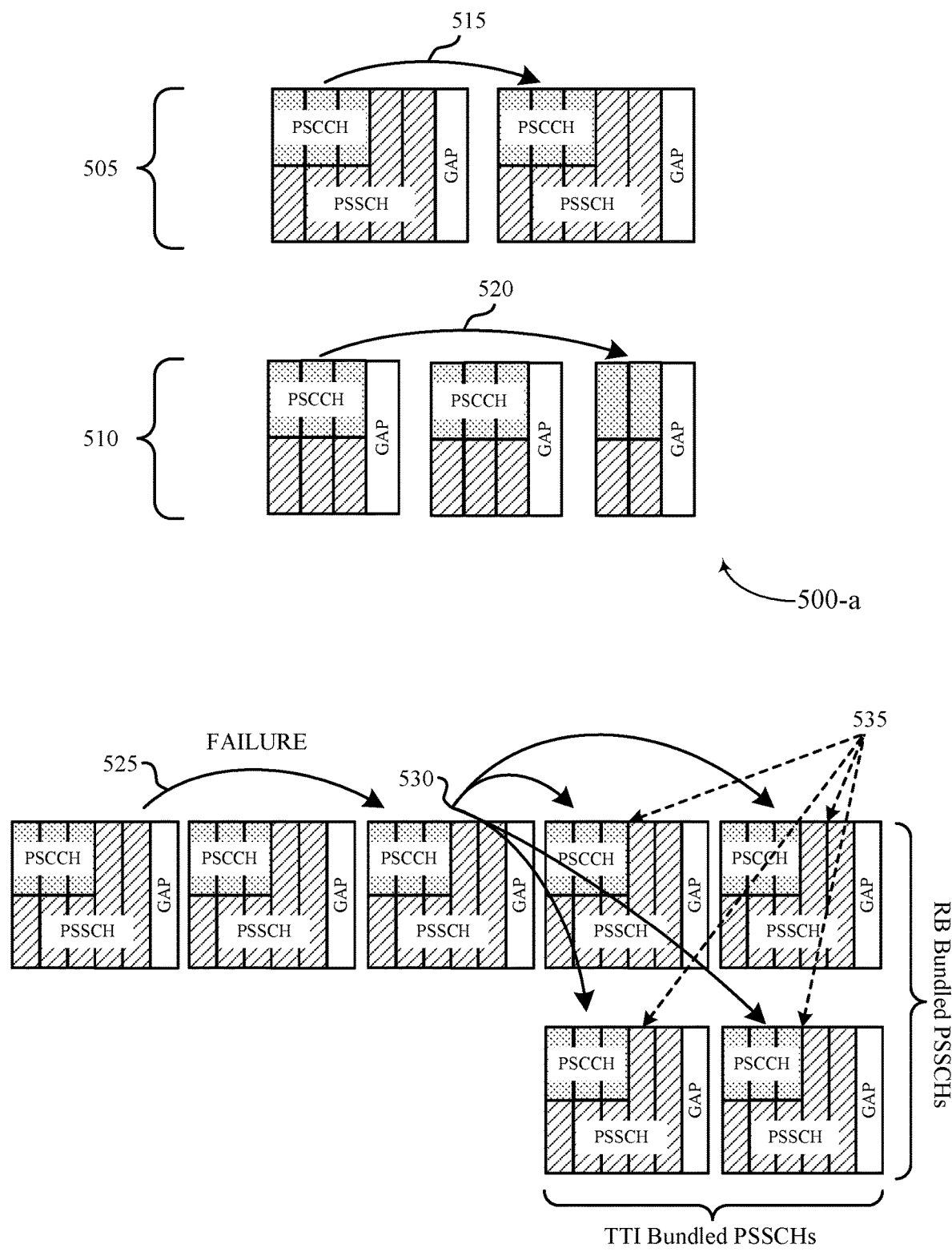

FIG. 5 illustrates an example of sidelink resource allocation configurations 500 (e.g., sidelink resource allocation configuration 500-a, sidelink resource allocation configuration 500-b) that support multiplexing forward and reverse sidelink resource allocation for bidirectional communications in accordance with aspects of the present disclosure. For example, the sidelink resource configurations 500-*a* and 500-*b* may be implemented at or by a wireless device such as a PLC or UE (e.g., S/A) as described with reference to FIGS. 1 and 2. Additionally or alternatively, the sidelink configurations 500 may be configured by a PLC or a base station described with reference to FIGS. 1 and 2.

The sidelink resource allocation configurations 500 may include a number of RBs which may be further grouped into sub-channels, a device may use to transmit data and control information via the PSCCH and PSSCH. For example, data may be allocated to a number of TBs including packets that are carried in the PSSCH. A TB can occupy one or several sub-channels depending on the size of the packet, the number of RBs per sub-channel, and the utilized MCS. Each TB has an associated SCI message that is carried in the PSCCH. In some examples, the SCI may be referred to as a scheduling assignment or a resource assignment, and may be of a first format (e.g., SCI 1) or a second format (e.g., SCI 2). In addition, a PSFCH may be included for some transmissions of feedback information. A gap period may be included between transmissions of the PSSCH.

In sidelink resource configuration 500-*a*, a PLC may allocate resources for future transmissions in forward directions (e.g., from the PLC to a UE or S/A) and reverse directions (e.g., from the UE or S/A to the PLC) via resources of the PSCCH. Sidelink resource configuration 500-*a* may include a number of mini-slots as part of a sidelink resource pool. For example, each mini-slot partition in the sidelink resource pool may be configured through RRC or higher layer signaling such that each partition has its own SCI 1 and SCI 2.

In some cases, the mini-slot partition in each slot is the same. For example, each slot has two mini slots (e.g., mini-slot partition 505) or three mini-slots (e.g., mini-slot partition 510). In some other cases, the mini-slot partitions between different slots may be different and each mini-slot partition may be applied periodically. For example, in some cases the two-mini-slot partition 505 and the three-mini-slot partition 510 may be applied to odd and even time slots respectively. In some other examples, a full slot format and the two-mini-slot partitions 505 and 510 may be applied to odd and even time slots, respectively.

In some examples, the PLC may transmit a first transmission of PSCCH and PSSCH to the UE (e.g., at 515 or 520), which includes a reverse-link resource assignment for a reverse direction (e.g., UE to PLC) for transmitting retransmissions, feedback transmissions, or new transmissions to the PLC. In some examples, the PLC may include a time indicator in SCI 1 for future reservations which is specified by mini-slot offsets or symbol offsets. For example, in some cases, a mini-slot offset may be specify the number of mini-slots between two adjacent reservations. In some other cases, a symbol offset may specify the number of OFDM symbols between two adjacent reservations. For example, the "time gap" field included in a DCI transmission (e.g., DCI 3_0).

Additionally or alternatively, the PLC may include a frequency indicator in SCI 1 for specifying the frequency offsets between adjacent reservations. For example, a frequency indicator may be applied for two future reservations. The PLC may allocate resources for future mini-slot transmissions in forward and reverse directions via the time and frequency indicators in PSCCH. For example, different traffic directions may be specified using a number of different techniques. In some cases, the future traffic directions may be configured through RRC or higher layer signaling. In some other examples, each future resource is allocated for the reverse direction, or the allocation of reverse and forward traffic alternates. In some other examples, the PLC may include an explicit direction indicator in SCI 1 or SCI 2 for specifying the directions of the future reservations. For example, the CRC of SCI 1, the CRC of SCI 2, or any combination thereof, may be scrambled by reverse-SL-RA-RNTI or alternate-SL-RA-RNTI which may be common for sidelink resource assignments. In some cases, the CRC of SCI 1 may remain unscrambled such that mode 2-configured UEs may decode the priority information and the future reserved resources for channel sensing. In some other examples, the PLC may transmit padding bits on the unused RBs if the PLC has no PSSCH data to transmit in the mini-slot PSSCH.

In sidelink resource configuration 500-*b*, a PLC may allocate resources for future transmissions in forward directions (e.g., from the PLC to a UE or S/A) and reverse directions (e.g., from the UE or S/A to the PLC) via resources of the PSCCH. Sidelink resource configuration 500-*a* may include a number of mini-slots as part of a sidelink resource pool. The sidelink resource configuration 500-*b* may include a resource allocation which includes transmissions of a TB across multiple mini-slot PSSCHs, which may increase reliability for transmissions (and retransmissions) of high priority data such as URLLC. For example, in some instances, HARQ procedures may be limited due to stringent latency targets of the high priority transmissions, so transmitting the TB across multiple mini slots as a PSSCH bundle may increase the probability of a successful transmission.

At 525, the UE may transmit a first transmission to the PLC, which may be unsuccessfully received by the PLC. At 530, the PLC may transmit a reverse link resource assignment including the PSCCH and PSSCH which includes an indication of PSSCH RB bunding or PSSCH TTI bundling that the UE may implement for retransmitting the failed transmission. At 535, the UE may retransmit the first transmission to the PLC.

In some examples, the PLC may use a PSSCH RB bundling indicator to indicate how many neighboring PSSCHs in the same mini-slot may be bundled together in the frequency domain for each future reservation. In some other examples, the PLC may use a PSSCH TTI bundling indicator to indicate a number of consecutive PSSCHs occupying the same subchannels (and spanning a number of RBs) are bundled together in one mini-slot for each future reservation. In some other examples, the PLC may use a PSSCH TTI-RB-bundling indicator along with an RB-bundling indicator to indicate a number repetitions of the set of RB-bundled PSSCHs in the time domain. In some other examples, the PLC may use a PSSCH RB-TTI-bundling indicator with a TTI-bundling indicator to indicate a number of repetitions of the set of TTI-bundled PSSCHs in the frequency domain.

In some cases, the PLC may transmit the bundling indicator (which may be a single bit indicator or a multi-bit indicator) via SCI 1 or SCI 2, where the corresponding bitmap may be configured or configured by RRC signaling or higher layers. For example, a bitmap value of 00 may correspond to a single PSSCH RB or TTI per bundle, a bitmap value of 01 may correspond to two PSSCH RBs or TTIs per bundle, a bitmap value of 10 may correspond to four PSSCH RBs or TTIs per bundle, and a bitmap value of 11 may correspond to eight PSSCH RBs or TTIs per bundle. Additionally or alternatively, different bitmap values may correspond to different PSSCH RBs or TTIs per bundle. In some other implementations, the PSSCH RB bundling indicator may be configured by RRC or higher layer signaling.

Figure 6:
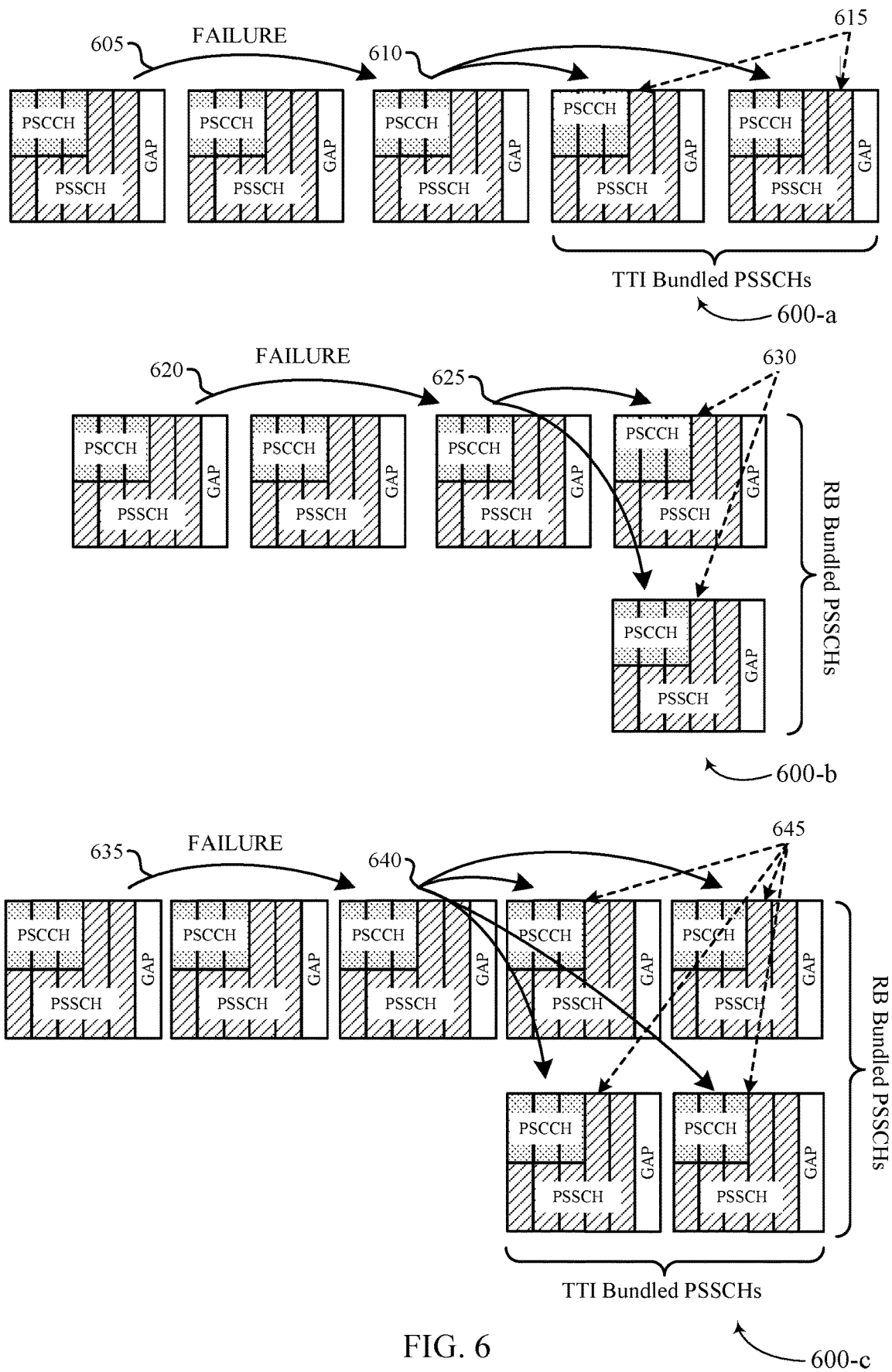

FIG. 6 illustrates an example of sidelink resource allocation configurations 600 (e.g., sidelink resource allocation configuration 600-a, sidelink resource allocation configuration 600-b, sidelink resource allocation configuration 600-c) that supports multiplexing forward and reverse sidelink resource allocation for bidirectional communications in accordance with aspects of the present disclosure. For example, the sidelink resource configurations 600-a, 600-b, and 600-c may be implemented at or by a wireless device such as a PLC or UE (e.g., S/A) as described with reference to FIGS. 1 and 2. Additionally or alternatively, the sidelink configurations 600 may be configured by a PLC or a base station described with reference to FIGS. 1 and 2.

The sidelink resource allocation configurations 600 may include a number of RBs which may be further grouped into sub-channels, a device may use to transmit data and control information via the PSCCH and PSSCH. For example, data may be allocated to a number of TBs including packets that are carried in the PSSCH. A TB can occupy one or several sub-channels depending on the size of the packet, the number of RBs per sub-channel, and the utilized MCS. Each TB has an associated SCI message that is carried in the PSCCH. In some examples, the SCI may be referred to as a scheduling assignment or a resource assignment, and may be of a first format (e.g., SCI 1) or a second format (e.g., SCI 2). In addition, a PSFCH may be included for some transmissions of feedback information. A gap period may be included between transmissions of the PSSCH.

In sidelink resource configurations 600, a PLC may allocate resources for future transmissions in forward directions (e.g., from the PLC to a UE or S/A) and reverse directions (e.g., from the UE or S/A to the PLC) via resources of the PSCCH. Sidelink resource configurations 600 may include a number of mini-slots as part of a sidelink resource pool.

The sidelink resource configurations 600-a, 600-b, and 600-c may each include a resource allocation which includes transmissions of a TB across multiple mini-slot PSSCHs, which may increase reliability for transmissions (and retransmissions) of high priority data such as URLLC. At 605, 620, and 635 the UE may transmit a first transmission to the PLC, which may be unsuccessfully received by the PLC. At 610, 625, and 640, the PLC may transmit a reverse link resource assignment including the PSCCH and PSSCH which includes an indication of PSSCH RB bunding or PSSCH TTI bundling that the UE may implement for retransmitting the failed transmission. At 615, 630, and 645, the UE may retransmit the first transmission to the PLC.

In the resource configuration 600-a, the PSSCHs may be grouped as TTI-bundled PSSCHs, while the PSSCHs of resource configuration 600-b may be grouped as RB-bundled PSSCHs. In the resource configuration 600-c, the PSSCHs may be grouped as either RB-bundled PSSCHs with repetitions in the time domain, or as TTI-bundled PSSCHs with repetitions in the frequency domain.

In the resource configurations 600-a, 600-b, and 600-c, for an instance of TTI-bundled PSSCHs (or RB-bundled PSSCHs with repetitions in the time domain), the gap symbols between two mini-slot transmissions in the TTI-bundled PSSCHs may be replaced by a PSSCH symbol to reduce control overhead. In some examples, the gap symbols may be replaced by a PSSCH symbol even in cases in which the gap symbols is the last sidelink symbol in a slot (e.g., at the slot boundary).

Figure 7:
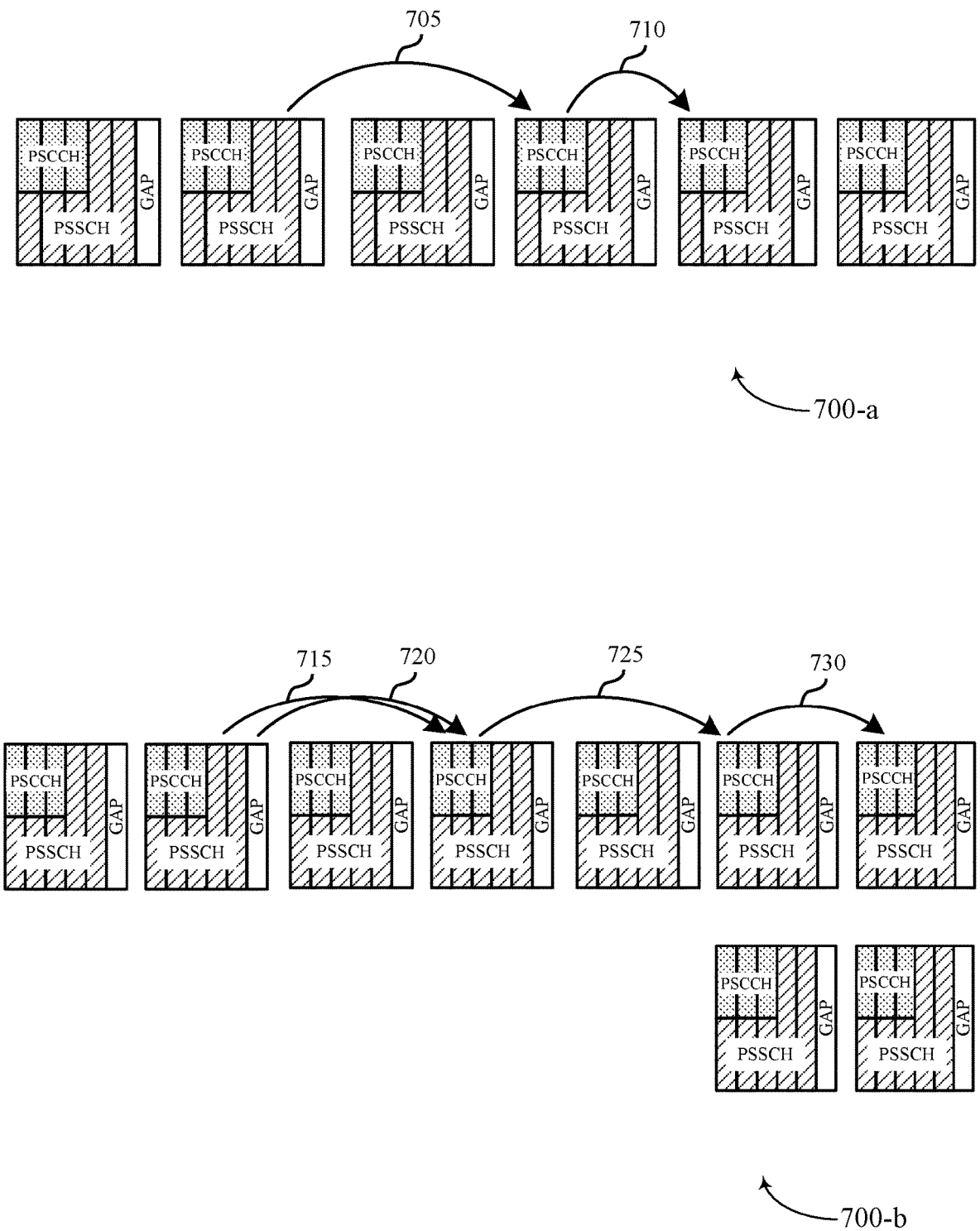

FIG. 7 illustrates an example of sidelink resource allocation configurations 700 (e.g., sidelink resource allocation configuration 700-a, sidelink resource allocation configuration 700-b) that support multiplexing forward and reverse sidelink resource allocation for bidirectional communications in accordance with aspects of the present disclosure. For example, the sidelink resource configurations 700-a and 700-b may be implemented at or by a wireless device such as a PLC or UE (e.g., S/A) as described with reference to FIGS. 1 and 2. Additionally or alternatively, the sidelink configurations 700 may be configured by a PLC or a base station described with reference to FIGS. 1 and 2.

The sidelink resource allocation configurations 700 may include a number of RBs which may be further grouped into sub-channels, a device may use to transmit data and control information via the PSCCH and PSSCH. For example, data may be allocated to a number of TBs including packets that are carried in the PSSCH. A TB can occupy one or several sub-channels depending on the size of the packet, the number of RBs per sub-channel, and the utilized MCS. Each TB has an associated SCI message that is carried in the PSCCH. In some examples, the SCI may be referred to as a scheduling assignment or a resource assignment, and may be of a first format (e.g., SCI 1) or a second format (e.g., SCI 2). In addition, a PSFCH may be included for some transmissions of feedback information. A gap period may be included between transmissions of the PSSCH.

In sidelink resource configurations 700, a PLC may allocate resources for future transmissions in forward directions (e.g., from the PLC to a UE or S/A) and reverse directions (e.g., from the UE or S/A to the PLC) via resources of the PSCCH. Sidelink resource configurations 700 may include a number of mini-slots as part of a sidelink resource pool. In some examples described with reference to sidelink resource configurations 700, different feedback (e.g., HARQ) configurations may be implemented to increase reliability for associated sidelink communications.

In sidelink resource configuration 700-a, the PLC may transmit a first transmission to the UE at 705, which may be successfully or unsuccessfully received by the UE. At 710, the UE may transmit feedback message (e.g., an ACK or a NACK) on a reverse link resource assignment to indicate whether the UE successfully received the first transmission from the PLC. In some examples, the FDRA and TDRA fields in SCI 1 may be repurposed for providing HARQ such that the UE may transmit the HARQ feedback on SCI 1 (e.g., in addition to or rather than on PSFCH). In such examples, the HARQ feedback in SCI 1 transmitted by the UE may be a dedicated feedback resource for transmissions from the PLC to the UE.

The feedback message may in some examples be a single bit which denotes ACK/NACK, or may be multiple bits which request additional resources for retransmissions (or a first transmission). For multi-bit feedback, the multiple bits may indicate the requested amount of additional resources (e.g., 0 to 7 TBs). In some other cases, a feedback message may include a concatenation of multiple feedback contents (e.g., multiple single-bit or multi-bit feedback messages may be concatenated in a single feedback message). In some other cases, the UE may transmit a combined feedback message which provides a single feedback content (e.g., a single bit or a multi-bit feedback message).

In some other cases, a UE may not have sidelink data to send and it may pad the unused mini-slot PSSCH resources when transmitting the HARQ feedback. Additionally or alternatively, the UE may include a "no-data indicator" in SCI 1 such that the PLC is not begin HARQ procedures.

In some other implementations, a UE may transmit HARQ feedback using other methods, and may not reuse the FDRA and TDRA fields in SCI 1. In such cases, the UE may transmit a HARQ indicator in SCI 1 to inform other UEs or the PLC that there is no future reservation in SCI 1 and that the SCI 1 contains HARQ feedback. For example, in some cases the HARQ feedback may include scrambling the CRC of SCI 1 using a sidelink RNTI (e.g., SL-RA-with-HARQ-RNTI) which may be common among all UEs. In some other examples, to reduce decoding complexity, values in the FDRA and TDRA fields may be configured through RRC or higher layers to indicate the presence of HARQ feedback. For example, one bit in the two fields can be used as the HARQ indicator and the remaining bits may be used for future resource reservation or HARQ feedback.

In sidelink resource configuration 700-b, the PLC may transmit a first transmission to the UE at 715, which may be successfully or unsuccessfully received by the UE. The PLC may also transmit a sidelink resource assignment to the UE at 720. At 725, the UE may transmit feedback message (e.g., an ACK or a NACK) on a reverse link resource assignment indicated by the PLC to indicate whether the UE successfully received the first transmission. At 730, the PLC may retransmit the first message based on the feedback message, and the UE may retransmit a feedback message in response to the retransmission.

In resource configurations 700, sidelink devices may transmit feedback without using resources of the PSFCH. In such cases, devices may transmit HARQ feedback for both traffic directions (e.g., forward and reverse) in SCI 1, which may increase reliability relative to transmissions of the PSFCH. In addition, transmitting HARQ in SCI 1 may reduce control overhead and latency by eliminating the PSFCH.

Figure 8:
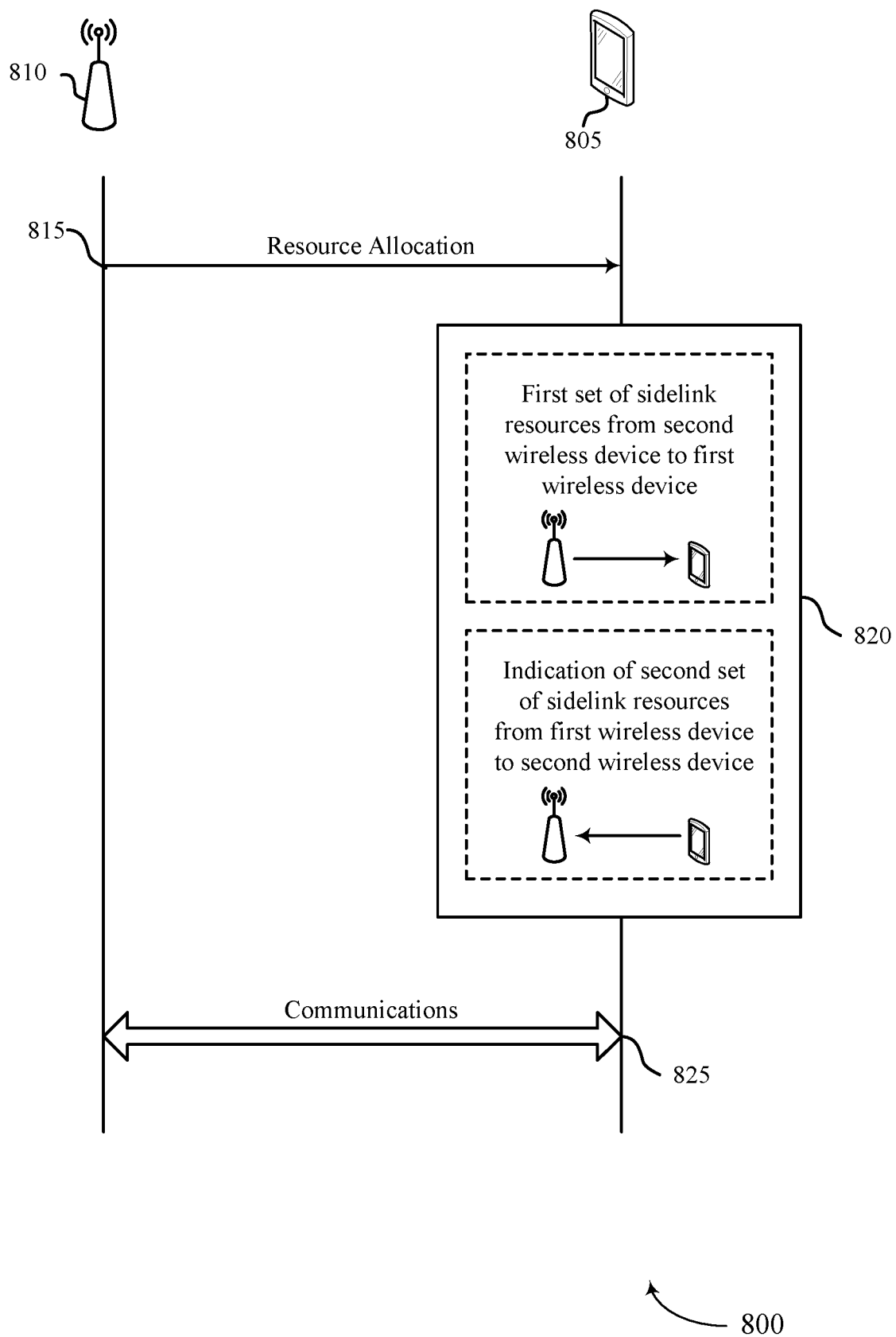
FIG. 8 illustrates an example of a process flow in a system that supports multiplexing forward and reverse sidelink resource allocation for bidirectional communications in accordance with aspects of the present disclosure.

FIG. 8 illustrates an example of a process flow 800 in a system that supports multiplexing forward and reverse sidelink resource allocation for bidirectional communications in accordance with aspects of the present disclosure. The process flow 800 may implement aspects of wireless communications systems 100 and 200, or may be implemented by aspects of the wireless communications system 100 and 200. For example, the process flow 800 may illustrate sidelink operations between a first wireless device 805 (e.g., a UE, an S/A) and a second wireless device 810 (e.g., a PLC), which may be examples of corresponding devices described with reference to FIGS. 1 and 2. In the following description of the process flow 800, the operations between the first wireless device 805 and the second wireless device 810 may be transmitted in a different order than the example order shown, or the operations performed by the first wireless device 805 and second wireless device 810 may be performed in different orders or at different times. Some operations may also be omitted from the process flow 800, and other operations may be added to the process flow 800.

At 815, the second wireless device 810 may transmit, and the first wireless device 805 may receive at 820, first SCI (e.g., a sidelink control message) that includes a resource assignment of a first set of one or more resources for a sidelink transmission from the second wireless device 810 to the first wireless device 805. The first SCI may also include an indication that schedules a second set of one or more resources for one or more additional sidelink transmissions between the first wireless device 805 and the second wireless device 810. In some examples, the second wireless device 810 may schedule additional sidelink transmissions after the sidelink transmission from the second wireless device 810 to the first wireless device 805.

In some cases, the first wireless device 805 may receive a control message which allocates the second set of resources for the additional sidelink transmissions. The additional sidelink transmissions may in some examples include sidelink transmissions from the first wireless device 805 to the second wireless device 810, or sidelink transmissions from the second wireless device 810 to the first wireless device 805.

In some examples, the additional sidelink transmissions may be scheduled as a sidelink transmission from the first wireless device 805 to the second wireless device 810 based on a first index value associated with the first sidelink transmission. The first wireless device 805 may determine that a first sidelink transmission of the additional sidelink transmissions is scheduled as a sidelink transmission from the first wireless device 805 to the second wireless device 810 based on a first index value associated with the first sidelink transmission. Similarly, a second sidelink transmission of the additional sidelink transmissions may be scheduled as another sidelink transmission from the second wireless device 810 to the first wireless device 805 based on a second index value associated with the second sidelink transmission. In such examples, the second index value may be different from the first index value (e.g., the first index value may be even-valued and the second index value may be odd-valued, or vice versa).

In some other examples, the first wireless device 805 may receive a communication direction indicator in SCI 1. The communication direction indicator may indicate the number of additional sidelink transmissions that are scheduled as sidelink transmissions from the first wireless device 805 to the second wireless device 810 or sidelink transmissions from the second wireless device 810 to the first wireless device 805. The first wireless device may determine that the additional sidelink transmissions are from the first wireless device 805 to the second wireless device 810 (e.g., forward direction), or the sidelink transmissions from the second wireless device 810 to the first wireless device 805 (e.g., reverse direction) based on the communication direction indicator.

In some other examples, the first wireless device 805 may receive SCI 2 from the second wireless device 810. In some cases, the CRC of the SCI 2 may be scrambled with a reverse sidelink RNTI. Additionally or alternatively, the CRC of SCI 1 may be scrambled with the reverse sidelink RNTI. Based on the RNTI, the first wireless device may determine that the additional sidelink transmissions each include sidelink transmissions from the first wireless device 805 to the second wireless device 810 (e.g., the reverse direction). In some other cases, the RNTI used to scramble the CRC of SCI 1 or SCI 2, or both, may be an alternate sidelink RNTI (e.g., indicating alternating communications directions), and the first wireless device 805 may determine that the additional sidelink transmissions alternate in communication direction based on the alternate sidelink RNTI.

In some cases, respective bits in the SCI 2 may correspond to either sidelink transmissions from the first wireless device 805 to the second wireless device 810 or sidelink transmissions from the second wireless device 810 to the first wireless device 805, and additional bits in the SCI may correspond to a number of the one or more additional sidelink transmissions.

In some other examples, the first wireless device 805 may receive a retransmission indicator in SCI 1 or SCI 2 which indicates one or more retransmissions from the first wireless device 805 to the second wireless device 810. The retransmission indicator may indicate a retransmission request, and the first wireless device 805 may retransmit one or more transmissions based on the retransmission request. In some examples, the retransmission indicator may be a single bit in SCI 1, a single bit in SCI 2, an implicit indication in a time and frequency resource allocation field of SCI 1, or any combination thereof.

In some cases, the first wireless device 805 may receive control signaling indicating one or more partitions for the first set of resources and the second set of resources. The partitions may be uniform partitions within a TTI or non-uniform partitions within the TTI, or a combination of uniform and non-uniform partitions. In such cases, each of the one or more partitions may be associated with respective SCI transmissions. In some examples, SCI 1 may be associated with a partition of a TTI, and the additional sidelink transmissions may be scheduled within partitions of the TTIs. The first wireless device 805 may receive a time indicator in SCI 1 that indicates a respective time offset between each of the additional sidelink transmissions. In some cases, the time offset may be associated with a quantity of mini-slots, or a quantity of symbol periods, or any combination thereof. The first wireless device may then receive a frequency indicator in SCI 1 that indicates a respective frequency offset between sequential sidelink transmissions of the additional sidelink transmissions.

In some examples, the first wireless device 805 may identify an RB bundling indicator which indicates one or more sidelink shared channels within a TTI to use for retransmissions from the first wireless device 805 to the second wireless device 810. In such examples, the RB bundling indicator may be configured, or may include bitmaps included in SCI 1 or SCI 2. The first wireless device 805 may map one or more sidelink transmissions from the first wireless device 805 to the second wireless device 810 to one or more sets of RBs in the TTI based on the RB bundling indicator. In some cases, the RB bundling indicator indicates a number of resources of the second set of resources in a same mini-slot that are bundled together for transmissions in a frequency domain. In some other cases, the RB bundling indicator indicates TTI bundling in which a number of resources of the second set of resources occupy a same subchannel and span a threshold number of RBs that are bundled together in a same mini-slot.

The first wireless device 805 may apply the RB bundling indicator with an additional indicator for identifying a number of repetitions of bundled consecutive RBs in a mini-slot, and may transmit a number of repetitions of the bundled consecutive RBs that are allocated for sidelink transmission from the first wireless device 805 to the second wireless device 810 in a time domain, a frequency domain, or both. In some examples, the first wireless device 805 may map sidelink transmissions from the first wireless device 805 to the second wireless device 810 to gap symbols between sets of consecutive RBs in a mini-slot based on the RB bundling indicator.

In some examples, the first wireless device 805 may receive a first sidelink message on a mini-slot of the first set of resources. The first wireless device 805 may generate a feedback message based on decoding the first sidelink message, and may transmit the feedback message to the second wireless device 810 in a field of SCI 1 or SCI 2 (e.g., an FDRA field or TDRA field). In some cases, the feedback message may be a number of bits corresponding to a request for additional resources for one or more retransmissions, or an initial transmission, or any combination thereof, of a sidelink message from the second wireless device 810 to the first wireless device 805.

In some examples, the feedback message may include a first bit present in at least one of the one or more fields of SCI 2, and a remaining number of bits in each of the one or more fields of SCI 2 may be associated with allocating sets of one or more resources for subsequent sidelink transmissions, one or more additional feedback messages, or any combination thereof.

In some other examples, the first sidelink message spans multiple mini-slots, and the feedback message may include a concatenation of bits that each correspond to an ACK or NACK of the first sidelink message for each mini-slot of the first transmission. This feedback message may include combined feedback for the multiple mini-slots corresponding to feedback message.

In some other examples, the first wireless device 805 may identify an absence of sidelink data to transmit in the SCI 2, and the first wireless device 805 may transmit the feedback message within SCI 2 with a number of padding bits, a no-data indicator, or both, based at least in part on the absence of sidelink data. In some other examples, the feedback indictor may not include a resource reservation for reverse transmissions, and that the one or more fields in the SCI 2 contain the feedback.

In some other cases, the feedback may be an RNTI associated with a replacement of a resource assignment with feedback which is used to scramble a number of CRC bits of SCI 2. In such cases, the RNTI may be common among the first wireless device 805 and the second wireless device 810. At 825, the first wireless device 805 and the second wireless device 810 may communicate over the sidelink shared channel using the first set of one or more resources and the second set of one or more resources (e.g., for forward and/or reverse sidelink transmissions).

Figure 9:
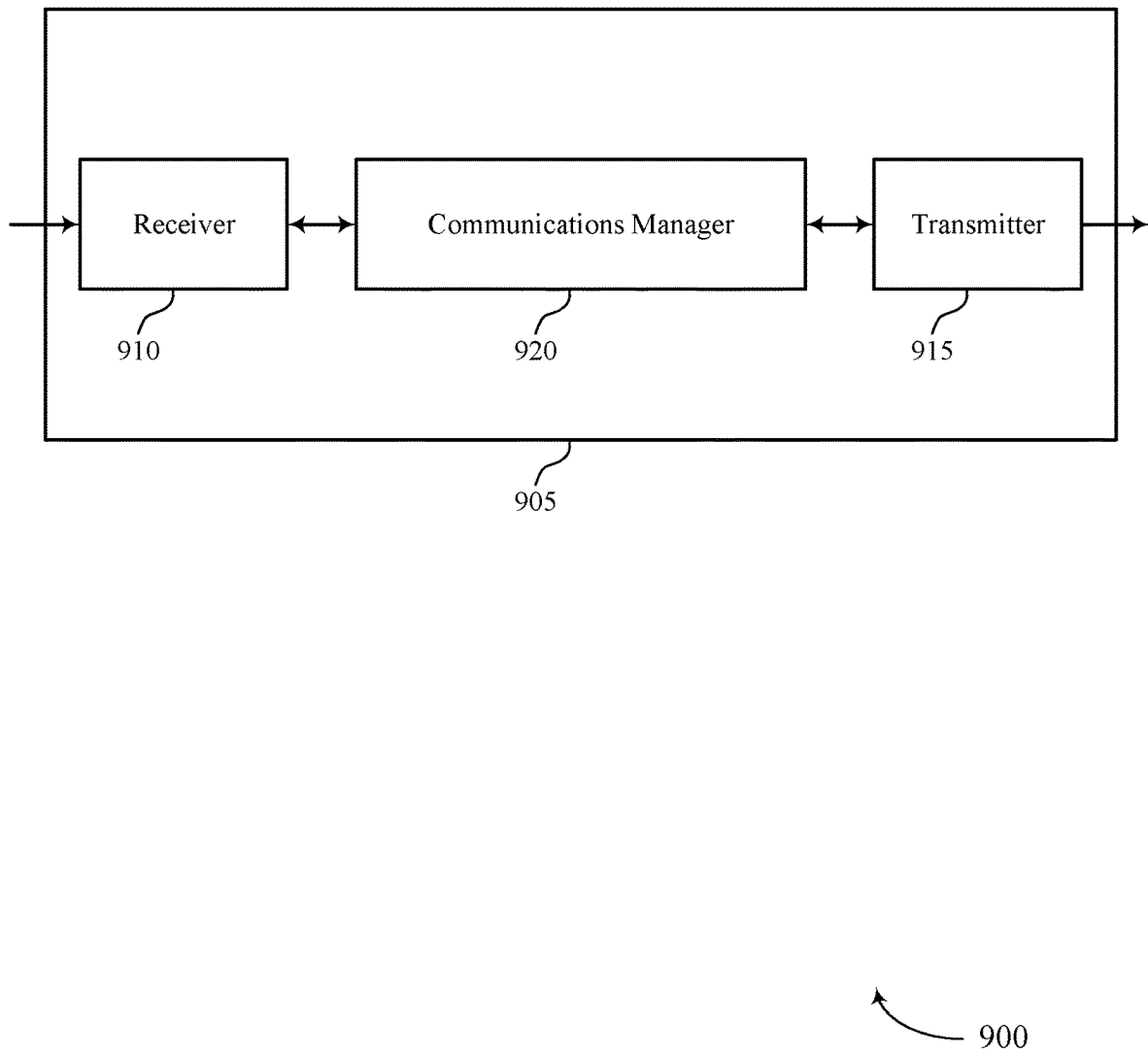
FIGS. 9 and 10 show block diagrams of devices that support multiplexing forward and reverse sidelink resource allocation for bidirectional communications in accordance with aspects of the present disclosure.

FIG. 9 shows a block diagram 900 of a device 905 that supports multiplexing forward and reverse sidelink resource allocation for bidirectional communications in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to multiplexing forward and reverse sidelink resource allocation for bidirectional communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multiplexing forward and reverse sidelink resource allocation for bidirectional communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of multiplexing forward and reverse sidelink resource allocation for bidirectional communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first wireless device in accordance with examples as disclosed herein. For example, the communications manager 920 may be configured as or otherwise support a means for receiving, from a second wireless device, first SCI including an allocation of a first set of one or more resources for a sidelink transmission from the second wireless device to the first wireless device and an indication that schedules a second set of one or more resources for one or more additional sidelink transmissions between the first wireless device and the second wireless device, where the one or more additional sidelink transmissions are scheduled to occur after the sidelink transmission from the second wireless device to the first wireless device. The communications manager 920 may be configured as or otherwise support a means for communicating with the second wireless device via a sidelink shared channel using the first set of one or more resources and the second set of one or more resources based on the indication.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, more efficient utilization of communication resources (e.g., efficient usage of sidelink communication resources between wireless devices in a system), resource bundling, and efficient usage of mini-slot architecture to increase resource usage efficiency.

Figure 10:
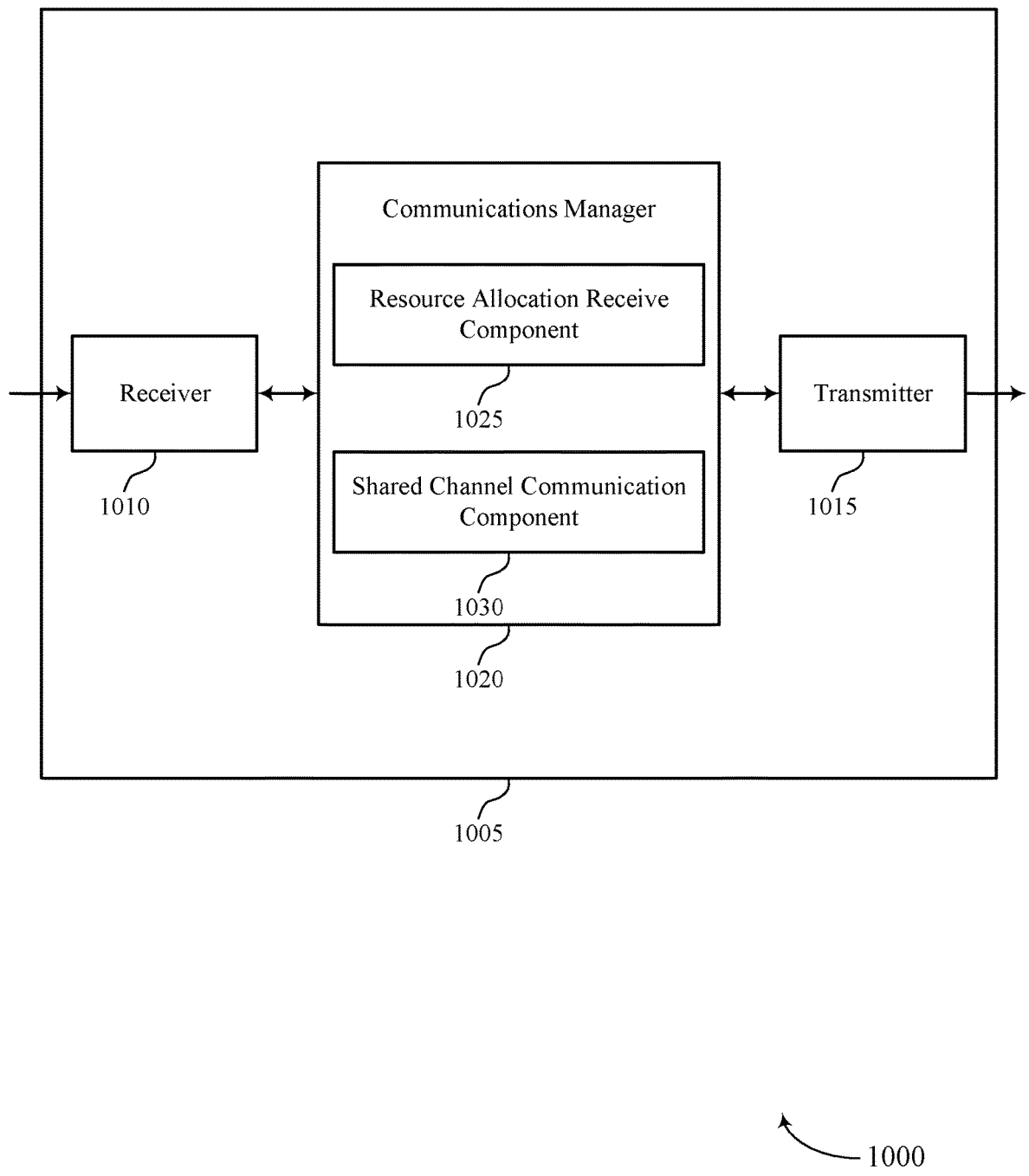

FIG. 10 shows a block diagram 1000 of a device 1005 that supports multiplexing forward and reverse sidelink resource allocation for bidirectional communications in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to multiplexing forward and reverse sidelink resource allocation for bidirectional communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to multiplexing forward and reverse sidelink resource allocation for bidirectional communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of multiplexing forward and reverse sidelink resource allocation for bidirectional communications as described herein. For example, the communications manager 1020 may include a resource allocation receive component 1025 a shared channel communication component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a first wireless device in accordance with examples as disclosed herein. The resource allocation receive component 1025 may be configured as or otherwise support a means for receiving, from a second wireless device, first SCI including an allocation of a first set of one or more resources for a sidelink transmission from the second wireless device to the first wireless device and an indication that schedules a second set of one or more resources for one or more additional sidelink transmissions between the first wireless device and the second wireless device, where the one or more additional sidelink transmissions are scheduled to occur after the sidelink transmission from the second wireless device to the first wireless device. The shared channel communication component 1030 may be configured as or otherwise support a means for communicating with the second wireless device via a sidelink shared channel using the first set of one or more resources and the second set of one or more resources based on the indication.

Figure 11:
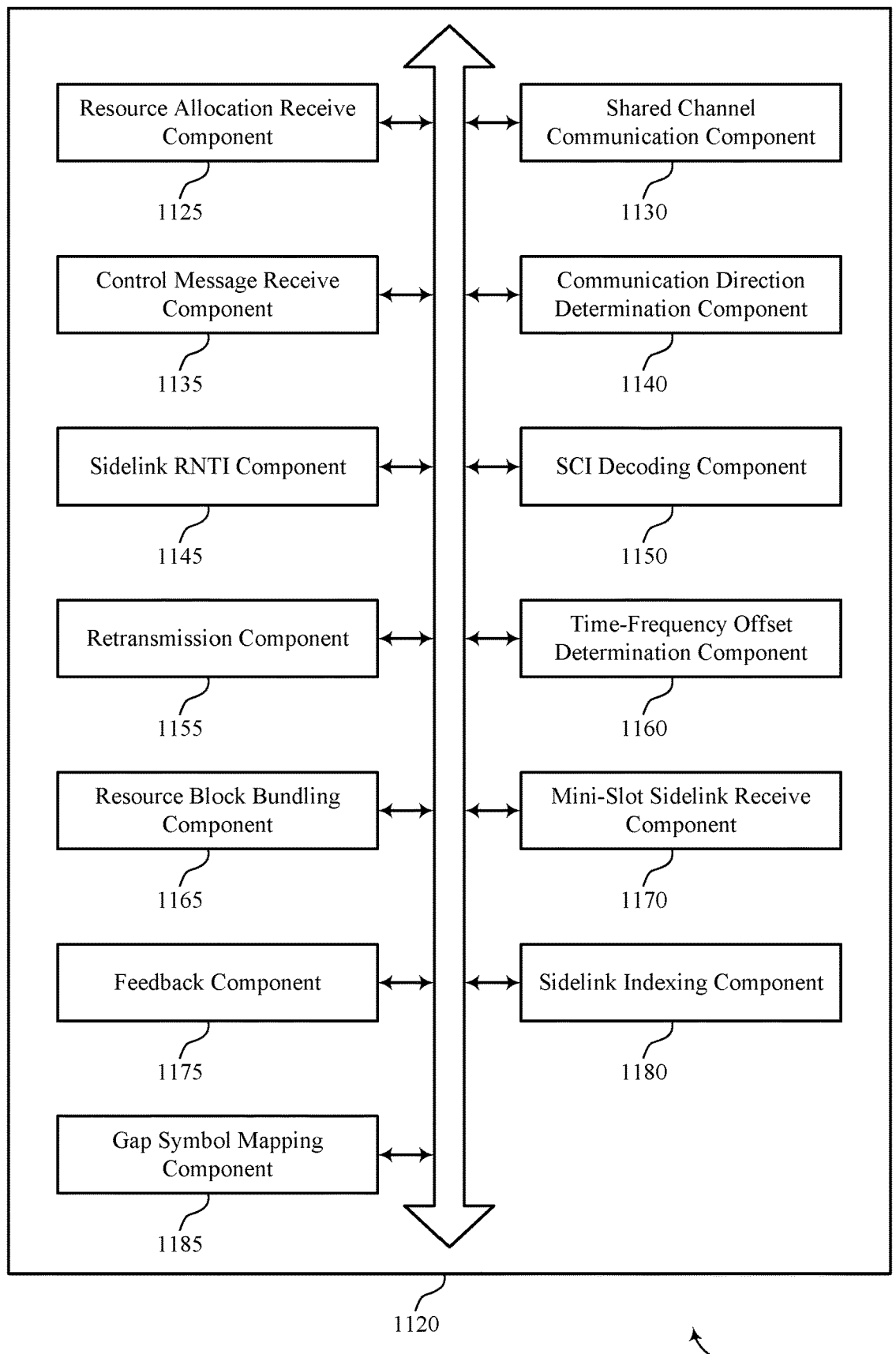
FIG. 11 shows a block diagram of a communications manager that supports multiplexing forward and reverse sidelink resource allocation for bidirectional communications in accordance with aspects of the present disclosure.

FIG. 11 shows a block diagram 1100 of a communications manager 1120 that supports multiplexing forward and reverse sidelink resource allocation for bidirectional communications in accordance with aspects of the present disclosure. The communications manager 1120 may be an example of aspects of a communications manager 920, a communications manager 1020, or both, as described herein. The communications manager 1120, or various components thereof, may be an example of means for performing various aspects of multiplexing forward and reverse sidelink resource allocation for bidirectional communications as described herein. For example, the communications manager 1120 may include a resource allocation receive component 1125, a shared channel communication component 1130, a control message receive component 1135, a communication direction determination component 1140, a sidelink RNTI component 1145, an SCI decoding component 1150, a retransmission component 1155, a time-frequency offset determination component 1160, a RB bundling component 1165, a mini-slot sidelink receive component 1170, a feedback component 1175, a sidelink indexing component 1180, a gap symbol mapping component 1185, or any combination thereof. Each of these components may communicate, directly or indirectly, with one another (e.g., via one or more buses).

The communications manager 1120 may support wireless communications at a first wireless device in accordance with examples as disclosed herein. The resource allocation receive component 1125 may be configured as or otherwise support a means for receiving, from a second wireless device, first SCI including an allocation of a first set of one or more resources for a sidelink transmission from the second wireless device to the first wireless device and an indication that schedules a second set of one or more resources for one or more additional sidelink transmissions between the first wireless device and the second wireless device, where the one or more additional sidelink transmissions are scheduled to occur after the sidelink transmission from the second wireless device to the first wireless device. The shared channel communication component 1130 may be configured as or otherwise support a means for communicating with the second wireless device via a sidelink shared channel using the first set of one or more resources and the second set of one or more resources based on the indication.

In some examples, the control message receive component 1135 may be configured as or otherwise support a means for receiving a control message allocating the second set of one or more resources for the one or more additional sidelink transmissions, the one or more additional sidelink transmissions including sidelink transmissions from the first wireless device to the second wireless device, or sidelink transmissions from the second wireless device to the first wireless device, or any combination thereof.

In some examples, each of the one or more additional sidelink transmissions scheduled by the first SCI is associated with a respective index value, and the sidelink indexing component 1180 may be configured as or otherwise support a means for determining that a first sidelink transmission of the one or more additional sidelink transmissions is scheduled as a sidelink transmission from the first wireless device to the second wireless device based on a first index value associated with the first sidelink transmission. In some examples, each of the one or more additional sidelink transmissions scheduled by the first SCI is associated with a respective index value, and the sidelink indexing component 1180 may be configured as or otherwise support a means for determining that a second sidelink transmission of the one or more additional sidelink transmissions is scheduled as another sidelink transmission from the second wireless device to the first wireless device based on a second index value associated with the second sidelink transmission, the second index value being different from the first index value.

In some examples, the first index value includes an even index value and the second index value includes an odd index value, or vice versa.

In some examples, the control message receive component 1135 may be configured as or otherwise support a means for determining that the one or more additional sidelink transmissions each include the sidelink transmissions from the first wireless device to the second wireless device based on the control message.

In some examples, the communication direction determination component 1140 may be configured as or otherwise support a means for receiving, within the first SCI, a communication direction indicator of whether the one or more additional sidelink transmissions are scheduled as sidelink transmissions from the first wireless device to the second wireless device or sidelink transmissions from the second wireless device to the first wireless device. In some examples, the communication direction determination component 1140 may be configured as or otherwise support a means for determining that the one or more additional sidelink transmissions include the sidelink transmissions from the first wireless device to the second wireless device, or the sidelink transmissions from the second wireless device to the first wireless device, or any combination thereof, based on the communication direction indicator.

In some examples, the sidelink RNTI component 1145 may be configured as or otherwise support a means for receiving second SCI from the second wireless device based on the first SCI, the first SCI, or the second SCI, or any combination thereof, having a set of multiple CRC bits scrambled with a reverse sidelink RNTI. In some examples, the sidelink RNTI component 1145 may be configured as or otherwise support a means for determining that the one or more additional sidelink transmissions each include sidelink transmissions from the first wireless device to the second wireless device based on the reverse sidelink RNTI.

In some examples, the sidelink RNTI component 1145 may be configured as or otherwise support a means for receiving second SCI from the second wireless device based on the first SCI, the first SCI, or the second SCI, or any combination thereof, having CRC bits scrambled with an alternate sidelink RNTI that is common to alternating sidelink transmissions. In some examples, the sidelink RNTI component 1145 may be configured as or otherwise support a means for determining that the one or more additional sidelink transmissions are scheduled to alternate between the sidelink transmissions from the first wireless device to the second wireless device and sidelink transmissions from the second wireless device to the first wireless device based on the alternate sidelink RNTI.

In some examples, the SCI decoding component 1150 may be configured as or otherwise support a means for receiving second SCI from the second wireless device based on the first SCI, where respective bits in the second SCI correspond to either sidelink transmissions from the first wireless device to the second wireless device or sidelink transmissions from the second wireless device to the first wireless device, and where a number of the respective bits corresponds to a number of the one or more additional sidelink transmissions.

In some examples, the SCI decoding component 1150 may be configured as or otherwise support a means for receiving, within the first SCI or second SCI associated with the first SCI, a retransmission indicator associated with one or more retransmissions from the first wireless device to the second wireless device. In some examples, the retransmission component 1155 may be configured as or otherwise support a means for identifying a retransmission request based on the retransmission indicator indicating a request to transmit the one or more retransmissions to the second wireless device. In some examples, the retransmission component 1155 may be configured as or otherwise support a means for transmitting the one or more retransmissions using the second set of one or more resources based on the retransmission request.

In some examples, the retransmission indicator includes a first bit in the first SCI, a second bit in the second SCI, an implicit indication in a time and frequency resource allocation field of the first SCI, or any combination thereof.

In some examples, the control message receive component 1135 may be configured as or otherwise support a means for receiving control signaling indicating one or more partitions for the first set of one or more resources and the second set of one or more resources, the one or more partitions including uniform partitions within a transmission time interval, or non-uniform partitions within the transmission time interval, or any combination thereof, where each partition of the one or more partitions is associated with respective SCI transmissions.

In some examples, the first SCI is associated with a partition of a transmission time interval, and the time-frequency offset determination component 1160 may be configured as or otherwise support a means for receiving, within the first SCI, a time indicator that indicates a respective time offset between each of the one or more additional sidelink transmissions, the respective time offset including a quantity of mini-slots, or a quantity of symbol periods, or any combination thereof. In some examples, the first SCI is associated with a partition of a transmission time interval, and the time-frequency offset determination component 1160 may be configured as or otherwise support a means for receiving, within the first SCI, a frequency indicator that indicates a respective frequency offset between sequential sidelink transmissions of the one or more additional sidelink transmissions.

In some examples, the RB bundling component 1165 may be configured as or otherwise support a means for identifying a RB bundling indicator indicating one or more sidelink shared channels within a transmission time interval to use for retransmissions from the first wireless device to the second wireless device, where the RB bundling indicator is configured, or includes a first bitmap included in the first SCI, or a second bitmap included in second SCI, or any combination thereof. In some examples, the RB bundling component 1165 may be configured as or otherwise support a means for mapping one or more sidelink transmissions from the first wireless device to the second wireless device to one or more sets of RBs in the transmission time interval based on the RB bundling indicator.

In some examples, the RB bundling indicator further indicates a number of resources of the second set of one or more resources in a same mini-slot that are bundled together for transmissions in a frequency domain.

In some examples, the RB bundling indicator further indicates transmission time interval bundling in which a number of resources of the second set of one or more resources occupy a same subchannel and span a threshold number of RBs that are bundled together in a same mini-slot.

In some examples, the RB bundling component 1165 may be configured as or otherwise support a means for applying the RB bundling indicator with an additional indicator for identifying a number of repetitions of bundled consecutive RBs in a mini-slot. In some examples, the RB bundling component 1165 may be configured as or otherwise support a means for transmitting, based on the RB bundling indicator and the additional indicator, a number of repetitions of the bundled consecutive RBs that are allocated for sidelink transmission from the first wireless device to the second wireless device in a time domain, a frequency domain, or both.

In some examples, the gap symbol mapping component 1185 may be configured as or otherwise support a means for mapping sidelink transmissions from the first wireless device to the second wireless device to a gap symbols between sets of consecutive RBs in a mini-slot based on the RB bundling indicator.

In some examples, the mini-slot sidelink receive component 1170 may be configured as or otherwise support a means for receiving, from the second wireless device, a first sidelink message on the first set of one or more resources, where the first sidelink message is received over at least one mini-slot. In some examples, the feedback component 1175 may be configured as or otherwise support a means for generating a feedback message based on decoding the first sidelink message from the second wireless device. In some examples, the feedback component 1175 may be configured as or otherwise support a means for transmitting, in one or more fields of second SCI over the sidelink control channel, the feedback message to the second wireless device.

In some examples, the feedback message includes a set of multiple bits corresponding to a request for additional resources for one or more retransmissions, or an initial transmission, or any combination thereof, of a sidelink message from the second wireless device to the first wireless device.

In some examples, the feedback message includes a concatenation of a set of multiple bits that each correspond to an acknowledgement or negative acknowledgement of the first sidelink message for each mini-slot of the set of multiple mini-slots. In some examples, the feedback message includes combined feedback for the set of multiple mini-slots corresponding to the acknowledgement or the negative acknowledgement of the first sidelink message.

In some examples, the feedback component 1175 may be configured as or otherwise support a means for identifying an absence of sidelink data to transmit in the second SCI. In some examples, the feedback component 1175 may be configured as or otherwise support a means for transmitting the feedback message within the second SCI including one or more padding bits, a no-data indicator, or both, based on the absence of sidelink data.

In some examples, the one or more fields of the second SCI includes a frequency domain resource allocation field, a time domain resource allocation field, or any combination thereof.

In some examples, the feedback component 1175 may be configured as or otherwise support a means for transmitting a feedback indicator within the second SCI based on generating the feedback message, the feedback indicator indicating an absence of a resource reservation in the second SCI and that the one or more fields of the second SCI include the feedback message.

In some examples, the feedback component 1175 may be configured as or otherwise support a means for scrambling a set of multiple CRC bits of the second SCI using a RNTI associated with a replacement of a resource assignment with feedback, the RNTI being common among a set of multiple wireless devices including the first wireless device, and where the RNTI includes the feedback indicator.

In some examples, the feedback indicator includes a first bit present in at least one of the one or more fields of the second SCI. In some examples, a remaining number of bits in each of the one or more fields are associated with allocating sets of one or more resources for subsequent sidelink transmissions, one or more additional feedback messages, or any combination thereof.

Figure 12:
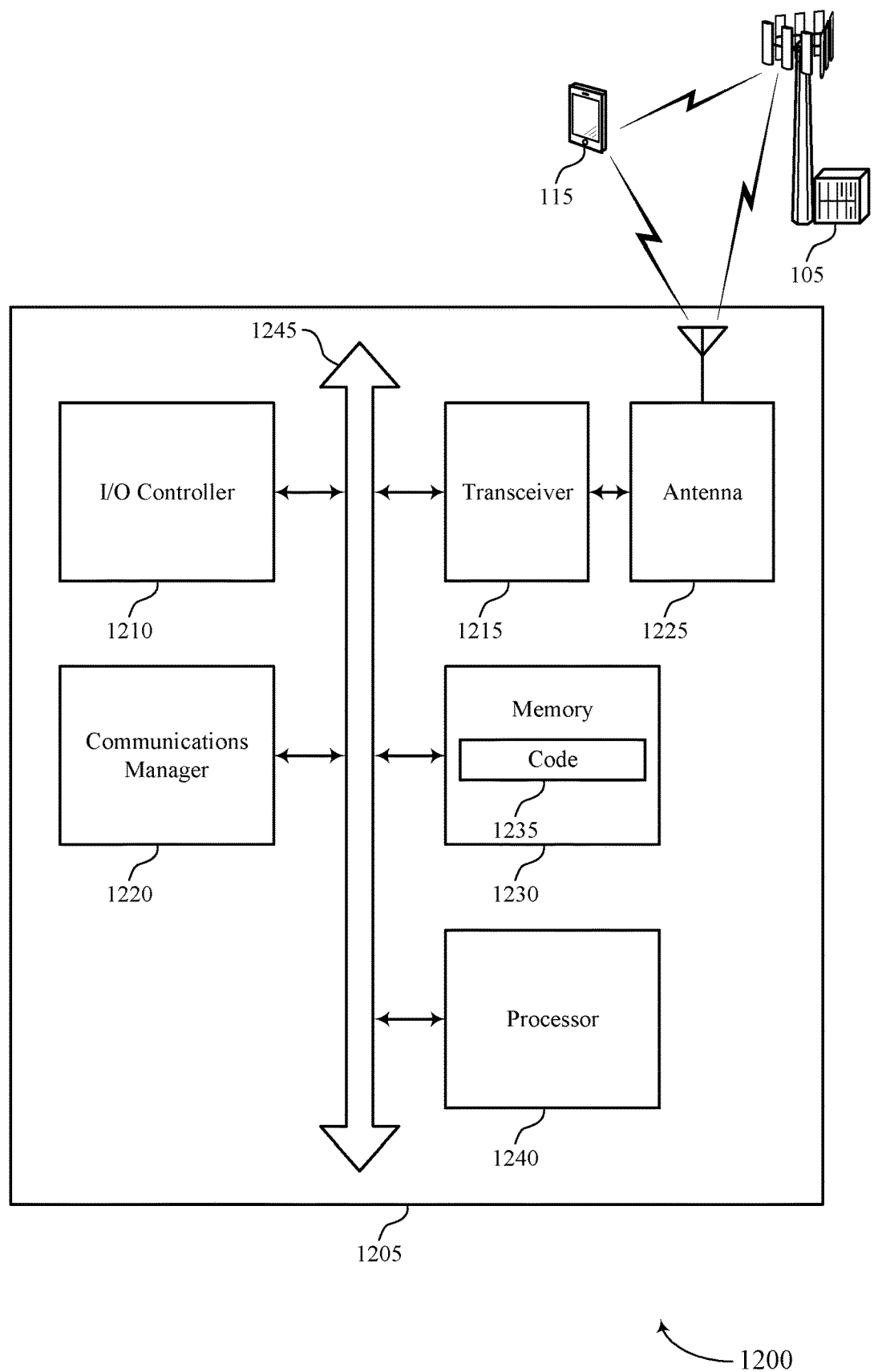
FIG. 12 shows a diagram of a system including a device that supports multiplexing forward and reverse sidelink resource allocation for bidirectional communications in accordance with aspects of the present disclosure.

FIG. 12 shows a diagram of a system 1200 including a device 1205 that supports multiplexing forward and reverse sidelink resource allocation for bidirectional communications in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting multiplexing forward and reverse sidelink resource allocation for bidirectional communications). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a first wireless device in accordance with examples as disclosed herein. For example, the communications manager 1220 may be configured as or otherwise support a means for receiving, from a second wireless device, first SCI including an allocation of a first set of one or more resources for a sidelink transmission from the second wireless device to the first wireless device and an indication that schedules a second set of one or more resources for one or more additional sidelink transmissions between the first wireless device and the second wireless device, where the one or more additional sidelink transmissions are scheduled to occur after the sidelink transmission from the second wireless device to the first wireless device. The communications manager 1220 may be configured as or otherwise support a means for communicating with the second wireless device via a sidelink shared channel using the first set of one or more resources and the second set of one or more resources based on the indication.

By including or configuring the communications manager 1220 in accordance with examples as described herein, the device 1205 may support techniques for improved communication reliability and feedback signaling techniques for sidelink, reduced latency, more efficient utilization of communication resources supporting forward and reverse communications directions for sidelink, improved coordination between devices, reduced control signaling overhead, more efficient resource bundling techniques, and usage of mini-slots for additional reduced latency.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of multiplexing forward and reverse sidelink resource allocation for bidirectional communications as described herein, or the processor 1240 and the memory 1230 may be otherwise configured to perform or support such operations.

Figure 13:
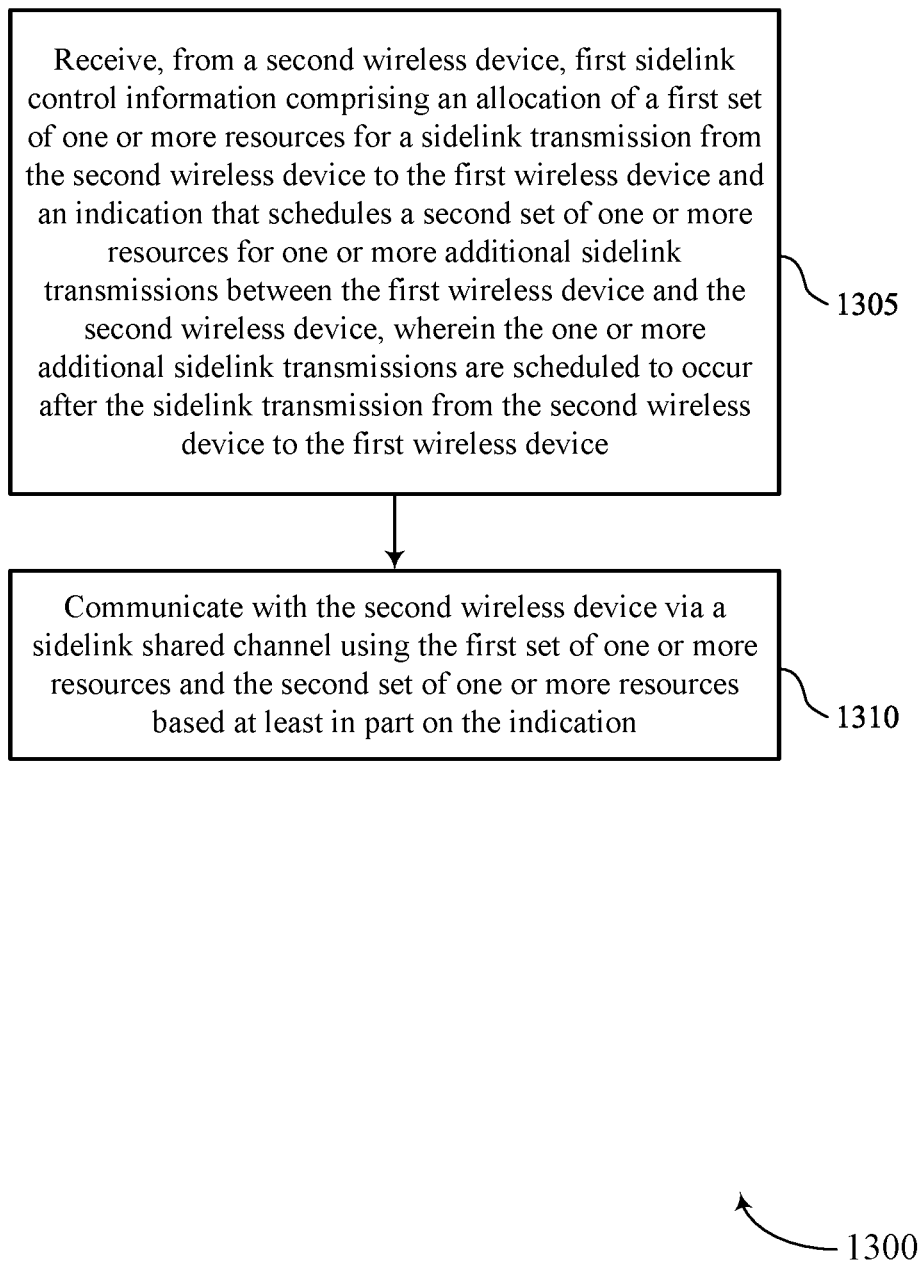
FIGS. 13 through 19 show flowcharts illustrating methods that support multiplexing forward and reverse sidelink resource allocation for bidirectional communications in accordance with aspects of the present disclosure.

FIG. 13 shows a flowchart illustrating a method 1300 that supports multiplexing forward and reverse sidelink resource allocation for bidirectional communications in accordance with aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1305, the method may include receiving, from a second wireless device, first SCI including an allocation of a first set of one or more resources for a sidelink transmission from the second wireless device to the first wireless device and an indication that schedules a second set of one or more resources for one or more additional sidelink transmissions between the first wireless device and the second wireless device, where the one or more additional sidelink transmissions are scheduled to occur after the sidelink transmission from the second wireless device to the first wireless device. The operations of 1305 may be performed in accordance with examples as disclosed herein. In some examples, aspects of the operations of 1305 may be performed by a resource allocation receive component 1125 as described with reference to FIG. 11.

At 1310, the method may include communicating with the second wireless device via a sidelink shared channel using the first set of one or more resources and the second set of one or more resources based on the indication. The operations of 1310 may be performed in accordance with examples as disclosed herein. In some examples, aspects of the operations of 1310 may be performed by a shared channel communication component 1130 as described with reference to FIG. 11.

Figure 14:
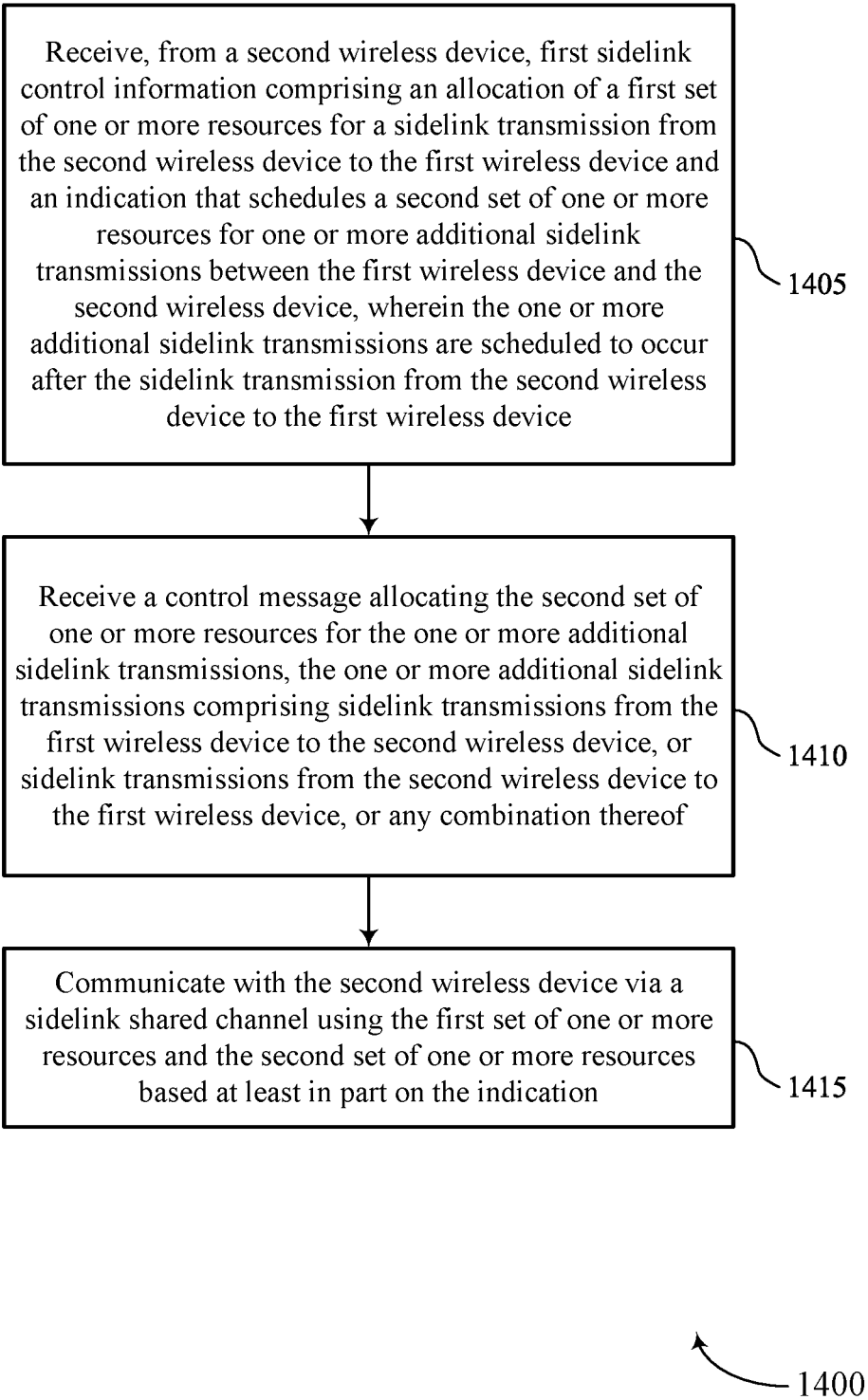

FIG. 14 shows a flowchart illustrating a method 1400 that supports multiplexing forward and reverse sidelink resource allocation for bidirectional communications in accordance with aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1405, the method may include receiving, from a second wireless device, first SCI including an allocation of a first set of one or more resources for a sidelink transmission from the second wireless device to the first wireless device and an indication that schedules a second set of one or more resources for one or more additional sidelink transmissions between the first wireless device and the second wireless device, where the one or more additional sidelink transmissions are scheduled to occur after the sidelink transmission from the second wireless device to the first wireless device. The operations of 1405 may be performed in accordance with examples as disclosed herein. In some examples, aspects of the operations of 1405 may be performed by a resource allocation receive component 1125 as described with reference to FIG. 11.

At 1410, the method may include receiving a control message allocating the second set of one or more resources for the one or more additional sidelink transmissions, the one or more additional sidelink transmissions including sidelink transmissions from the first wireless device to the second wireless device, or sidelink transmissions from the second wireless device to the first wireless device, or any combination thereof. The operations of 1410 may be performed in accordance with examples as disclosed herein. In some examples, aspects of the operations of 1410 may be performed by a control message receive component 1135 as described with reference to FIG. 11.

At 1415, the method may include communicating with the second wireless device via a sidelink shared channel using the first set of one or more resources and the second set of one or more resources based on the indication. The operations of 1415 may be performed in accordance with examples as disclosed herein. In some examples, aspects of the operations of 1415 may be performed by a shared channel communication component 1130 as described with reference to FIG. 11.

Figure 15:
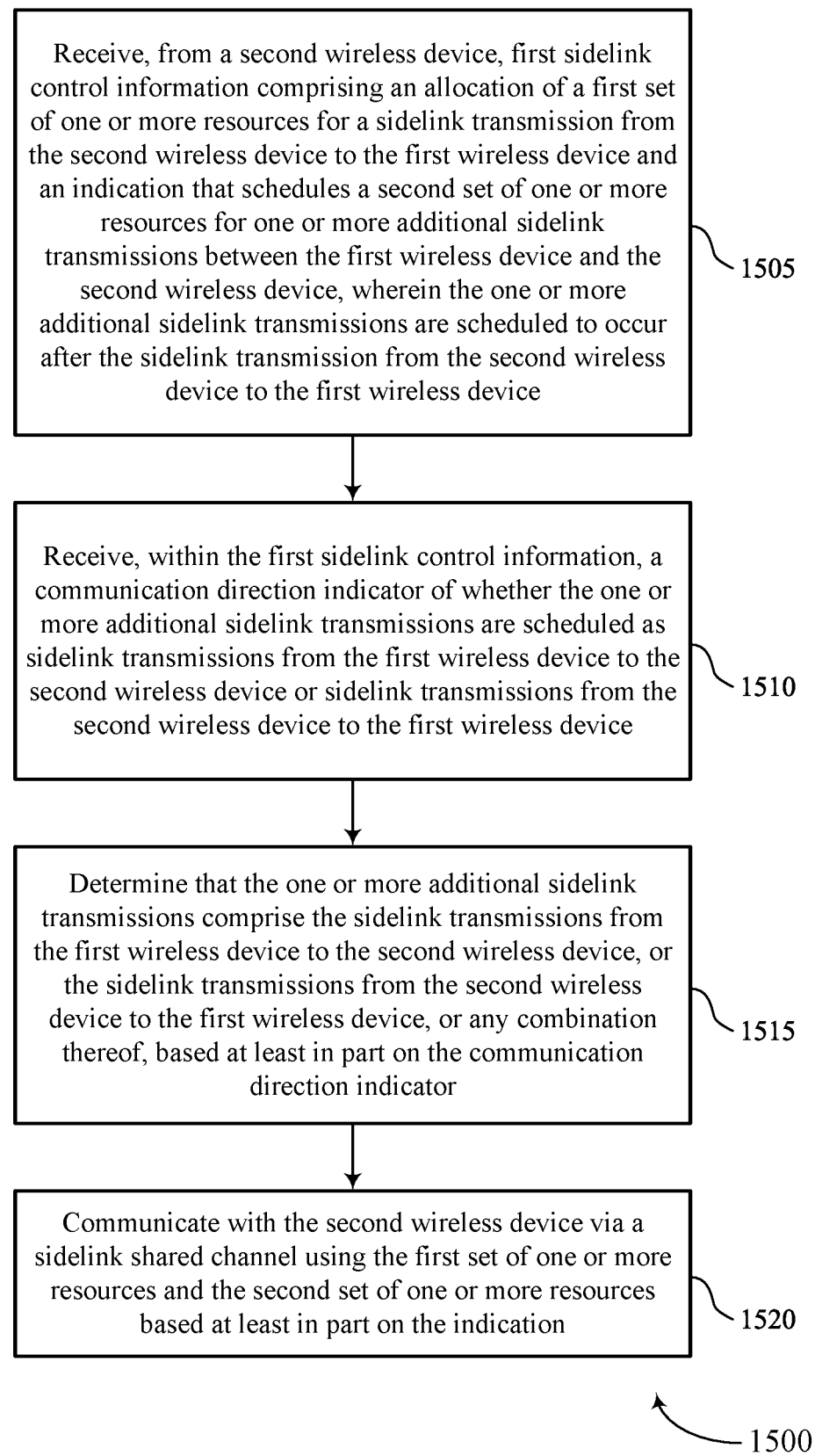

FIG. 15 shows a flowchart illustrating a method 1500 that supports multiplexing forward and reverse sidelink resource allocation for bidirectional communications in accordance with aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1505, the method may include receiving, from a second wireless device, first SCI including an allocation of a first set of one or more resources for a sidelink transmission from the second wireless device to the first wireless device and an indication that schedules a second set of one or more resources for one or more additional sidelink transmissions between the first wireless device and the second wireless device, where the one or more additional sidelink transmissions are scheduled to occur after the sidelink transmission from the second wireless device to the first wireless device. The operations of 1505 may be performed in accordance with examples as disclosed herein. In some examples, aspects of the operations of 1505 may be performed by a resource allocation receive component 1125 as described with reference to FIG. 11.

At 1510, the method may include receiving, within the first SCI, a communication direction indicator of whether the one or more additional sidelink transmissions are scheduled as sidelink transmissions from the first wireless device to the second wireless device or sidelink transmissions from the second wireless device to the first wireless device. The operations of 1510 may be performed in accordance with examples as disclosed herein. In some examples, aspects of the operations of 1510 may be performed by a communication direction determination component 1140 as described with reference to FIG. 11.

At 1515, the method may include determining that the one or more additional sidelink transmissions include the sidelink transmissions from the first wireless device to the second wireless device, or the sidelink transmissions from the second wireless device to the first wireless device, or any combination thereof, based on the communication direction indicator. The operations of 1515 may be performed in accordance with examples as disclosed herein. In some examples, aspects of the operations of 1515 may be performed by a communication direction determination component 1140 as described with reference to FIG. 11.

At 1520, the method may include communicating with the second wireless device via a sidelink shared channel using the first set of one or more resources and the second set of one or more resources based on the indication. The operations of 1520 may be performed in accordance with examples as disclosed herein. In some examples, aspects of the operations of 1520 may be performed by a shared channel communication component 1130 as described with reference to FIG. 11.

Figure 16:
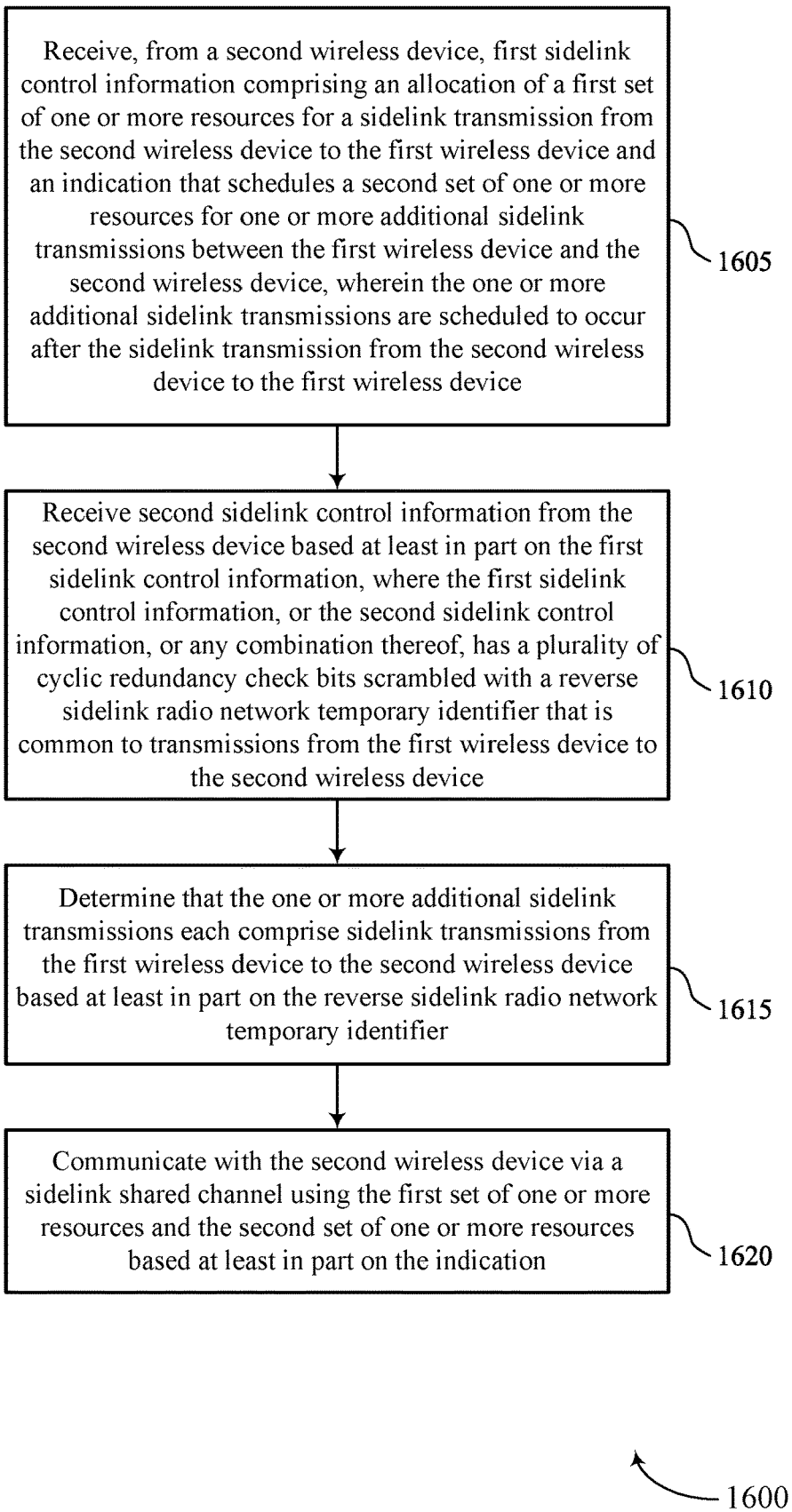

FIG. 16 shows a flowchart illustrating a method 1600 that supports multiplexing forward and reverse sidelink resource allocation for bidirectional communications in accordance with aspects of the present disclosure. The operations of the method 1600 may be implemented by a UE or its components as described herein. For example, the operations of the method 1600 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1605, the method may include receiving, from a second wireless device, first SCI including an allocation of a first set of one or more resources for a sidelink transmission from the second wireless device to the first wireless device and an indication that schedules a second set of one or more resources for one or more additional sidelink transmissions between the first wireless device and the second wireless device, where the one or more additional sidelink transmissions are scheduled to occur after the sidelink transmission from the second wireless device to the first wireless device. The operations of 1605 may be performed in accordance with examples as disclosed herein. In some examples, aspects of the operations of 1605 may be performed by a resource allocation receive component 1125 as described with reference to FIG. 11.

At 1610, the method may include receiving second SCI from the second wireless device based on the first SCI, the first SCI, or the second SCI, or any combination thereof, having a set of multiple CRC bits scrambled with a reverse sidelink RNTI. The operations of 1610 may be performed in accordance with examples as disclosed herein. In some examples, aspects of the operations of 1610 may be performed by a sidelink RNTI component 1145 as described with reference to FIG. 11.

At 1615, the method may include determining that the one or more additional sidelink transmissions each include sidelink transmissions from the first wireless device to the second wireless device based on the reverse sidelink RNTI. The operations of 1615 may be performed in accordance with examples as disclosed herein. In some examples, aspects of the operations of 1615 may be performed by a sidelink RNTI component 1145 as described with reference to FIG. 11.

At 1620, the method may include communicating with the second wireless device via a sidelink shared channel using the first set of one or more resources and the second set of one or more resources based on the indication. The operations of 1620 may be performed in accordance with examples as disclosed herein. In some examples, aspects of the operations of 1620 may be performed by a shared channel communication component 1130 as described with reference to FIG. 11.

Figure 17:
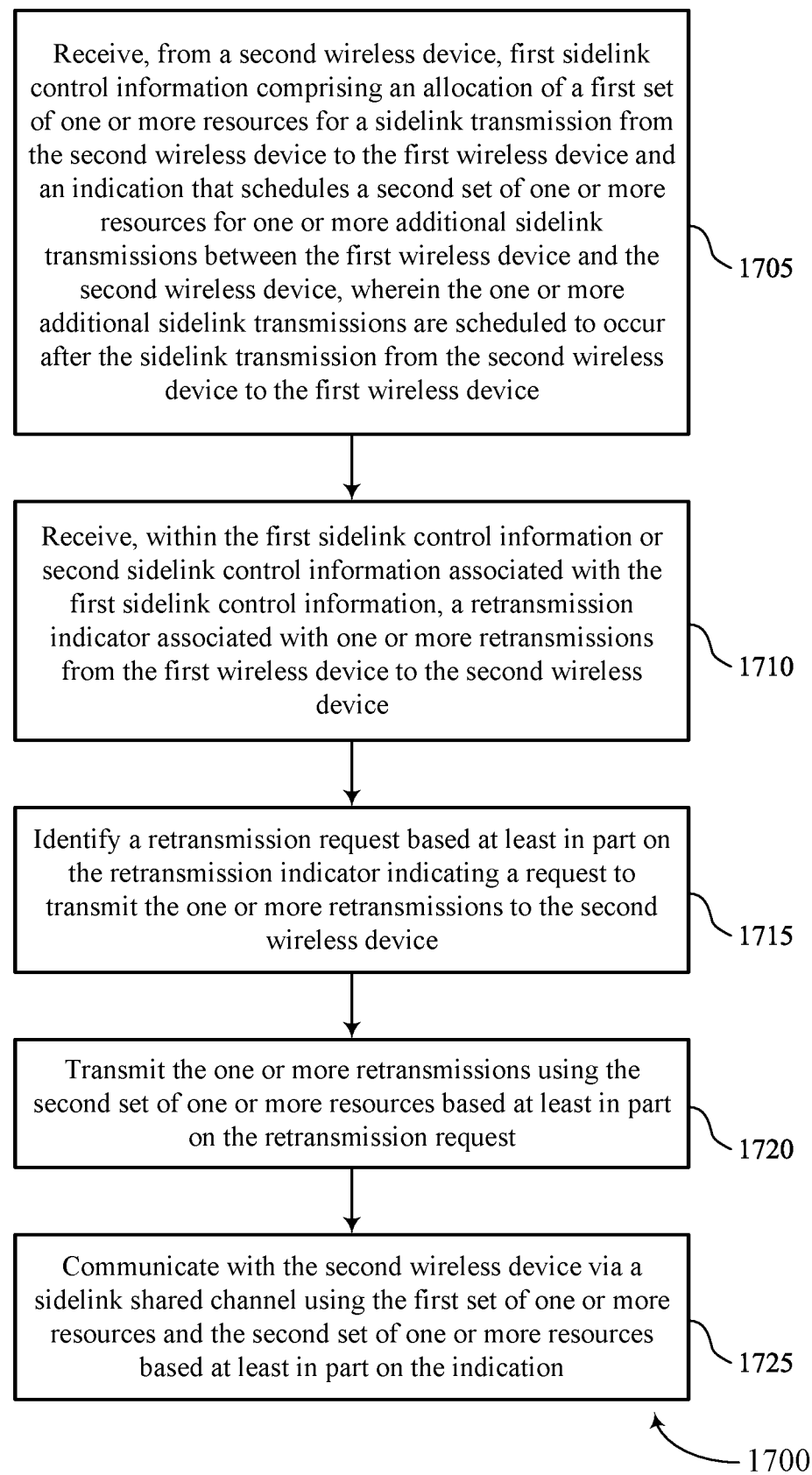

FIG. 17 shows a flowchart illustrating a method 1700 that supports multiplexing forward and reverse sidelink resource allocation for bidirectional communications in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include receiving, from a second wireless device, first SCI including an allocation of a first set of one or more resources for a sidelink transmission from the second wireless device to the first wireless device and an indication that schedules a second set of one or more resources for one or more additional sidelink transmissions between the first wireless device and the second wireless device, where the one or more additional sidelink transmissions are scheduled to occur after the sidelink transmission from the second wireless device to the first wireless device. The operations of 1705 may be performed in accordance with examples as disclosed herein. In some examples, aspects of the operations of 1705 may be performed by a resource allocation receive component 1125 as described with reference to FIG. 11.

At 1710, the method may include receiving, within the first SCI or second SCI associated with the first SCI, a retransmission indicator associated with one or more retransmissions from the first wireless device to the second wireless device. The operations of 1710 may be performed in accordance with examples as disclosed herein. In some examples, aspects of the operations of 1710 may be performed by an SCI decoding component 1150 as described with reference to FIG. 11.

At 1715, the method may include identifying a retransmission request based on the retransmission indicator indicating a request to transmit the one or more retransmissions to the second wireless device. The operations of 1715 may be performed in accordance with examples as disclosed herein. In some examples, aspects of the operations of 1715 may be performed by a retransmission component 1155 as described with reference to FIG. 11.

At 1720, the method may include transmitting the one or more retransmissions using the second set of one or more resources based on the retransmission request. The operations of 1720 may be performed in accordance with examples as disclosed herein. In some examples, aspects of the operations of 1720 may be performed by a retransmission component 1155 as described with reference to FIG. 11.

At 1725, the method may include communicating with the second wireless device via a sidelink shared channel using the first set of one or more resources and the second set of one or more resources based on the indication. The operations of 1725 may be performed in accordance with examples as disclosed herein. In some examples, aspects of the operations of 1725 may be performed by a shared channel communication component 1130 as described with reference to FIG. 11.

Figure 18:
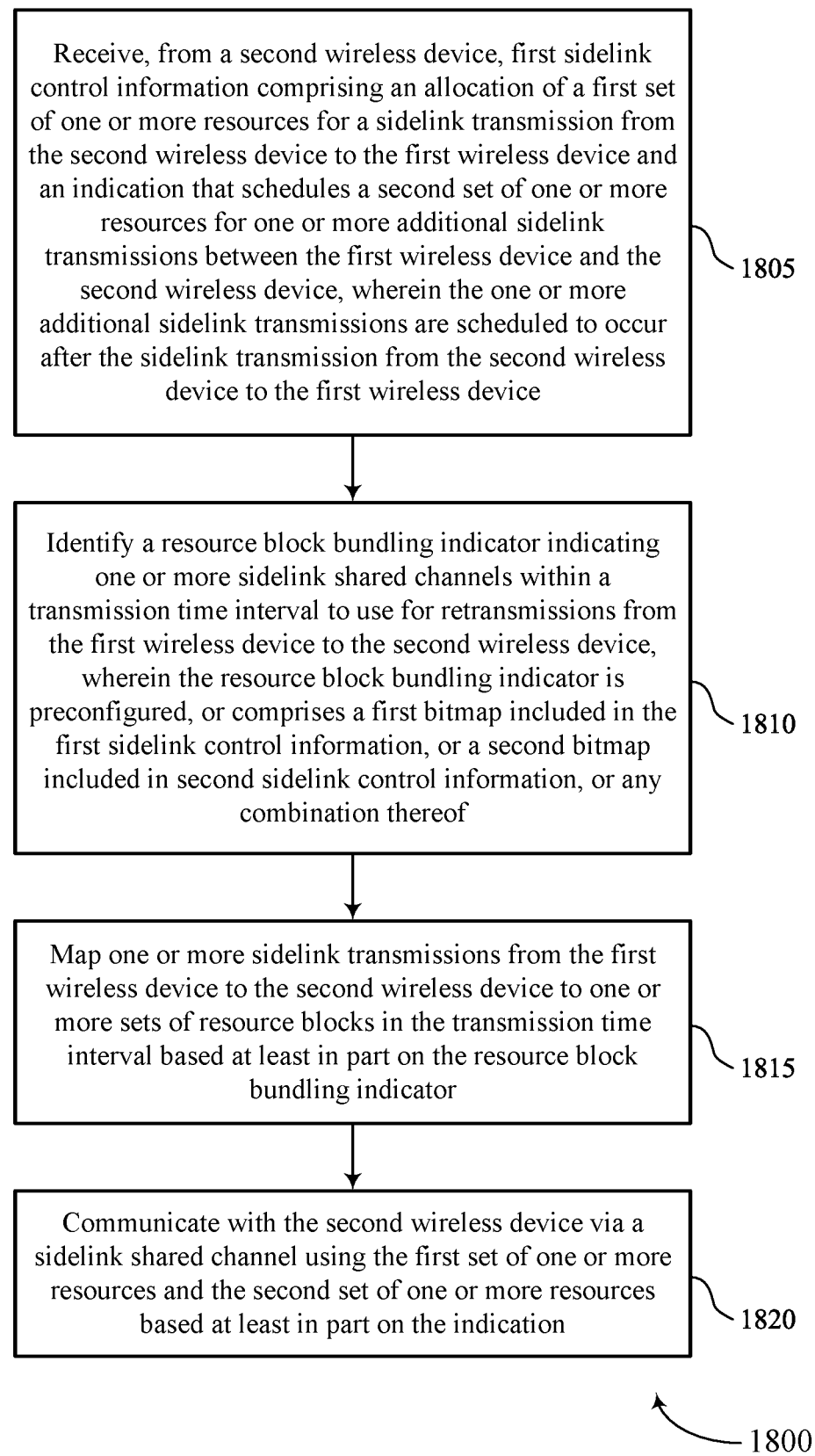

FIG. 18 shows a flowchart illustrating a method 1800 that supports multiplexing forward and reverse sidelink resource allocation for bidirectional communications in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include receiving, from a second wireless device, first SCI including an allocation of a first set of one or more resources for a sidelink transmission from the second wireless device to the first wireless device and an indication that schedules a second set of one or more resources for one or more additional sidelink transmissions between the first wireless device and the second wireless device, where the one or more additional sidelink transmissions are scheduled to occur after the sidelink transmission from the second wireless device to the first wireless device. The operations of 1805 may be performed in accordance with examples as disclosed herein. In some examples, aspects of the operations of 1805 may be performed by a resource allocation receive component 1125 as described with reference to FIG. 11.

At 1810, the method may include identifying a RB bundling indicator indicating one or more sidelink shared channels within a transmission time interval to use for retransmissions from the first wireless device to the second wireless device, where the RB bundling indicator is configured, or includes a first bitmap included in the first SCI, or a second bitmap included in second SCI, or any combination thereof. The operations of 1810 may be performed in accordance with examples as disclosed herein. In some examples, aspects of the operations of 1810 may be performed by a RB bundling component 1165 as described with reference to FIG. 11.

At 1815, the method may include mapping one or more sidelink transmissions from the first wireless device to the second wireless device to one or more sets of RBs in the transmission time interval based on the RB bundling indicator. The operations of 1815 may be performed in accordance with examples as disclosed herein. In some examples, aspects of the operations of 1815 may be performed by a RB bundling component 1165 as described with reference to FIG. 11.

At 1820, the method may include communicating with the second wireless device via a sidelink shared channel using the first set of one or more resources and the second set of one or more resources based on the indication. The operations of 1820 may be performed in accordance with examples as disclosed herein. In some examples, aspects of the operations of 1820 may be performed by a shared channel communication component 1130 as described with reference to FIG. 11.

Figure 19:
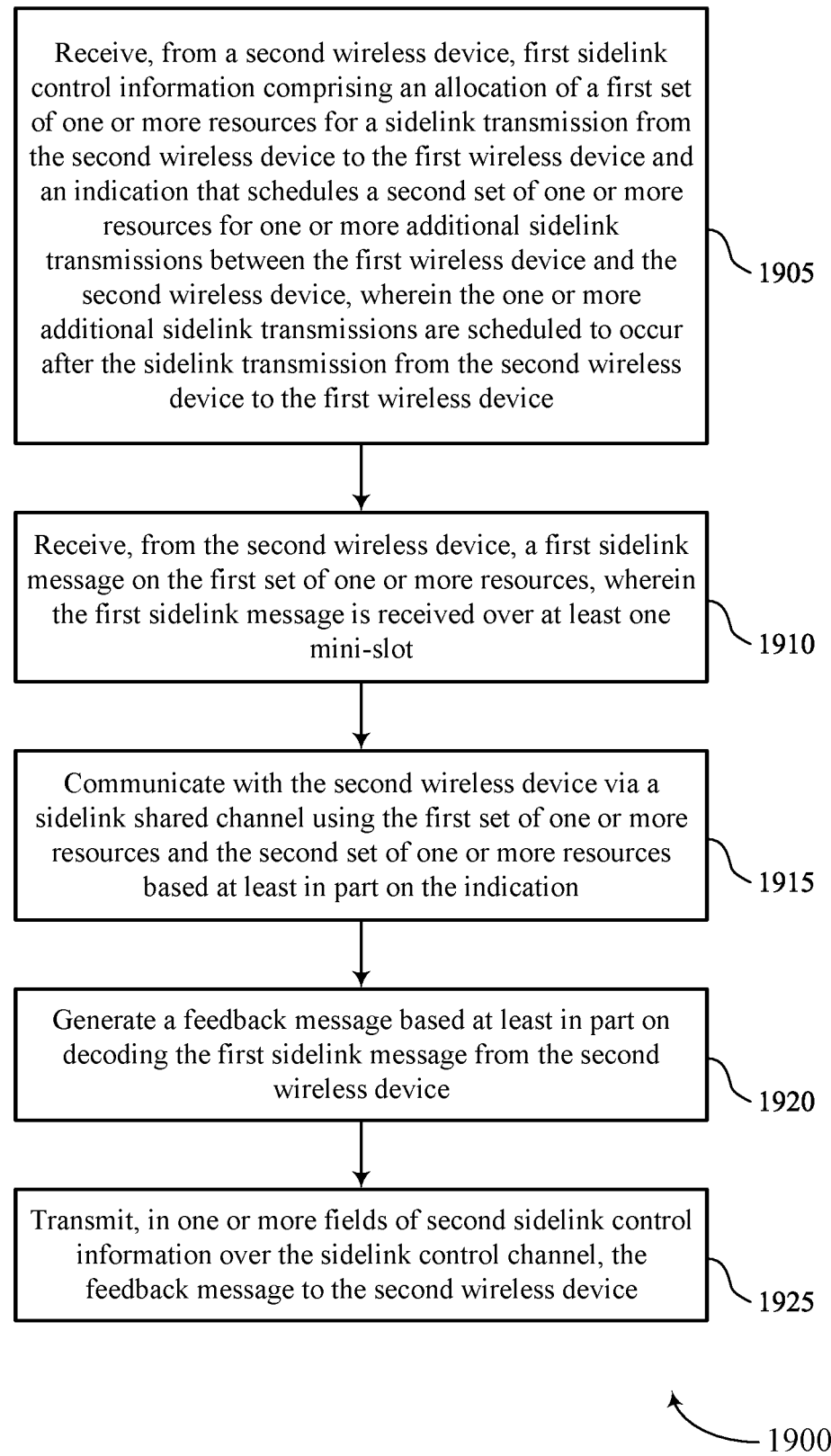

FIG. 19 shows a flowchart illustrating a method 1900 that supports multiplexing forward and reverse sidelink resource allocation for bidirectional communications in accordance with aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1905, the method may include receiving, from a second wireless device, first SCI including an allocation of a first set of one or more resources for a sidelink transmission from the second wireless device to the first wireless device and an indication that schedules a second set of one or more resources for one or more additional sidelink transmissions between the first wireless device and the second wireless device, where the one or more additional sidelink transmissions are scheduled to occur after the sidelink transmission from the second wireless device to the first wireless device. The operations of 1905 may be performed in accordance with examples as disclosed herein. In some examples, aspects of the operations of 1905 may be performed by a resource allocation receive component 1125 as described with reference to FIG. 11.

At 1910, the method may include receiving, from the second wireless device, a first sidelink message on the first set of one or more resources, where the first sidelink message is received over at least one mini-slot. The operations of 1910 may be performed in accordance with examples as disclosed herein. In some examples, aspects of the operations of 1910 may be performed by a mini-slot sidelink receive component 1170 as described with reference to FIG. 11.

At 1915, the method may include generating a feedback message based on decoding the first sidelink message from the second wireless device. The operations of 1915 may be performed in accordance with examples as disclosed herein. In some examples, aspects of the operations of 1915 may be performed by a feedback component 1175 as described with reference to FIG. 11.

At 1920, the method may include communicating with the second wireless device via a sidelink shared channel using the first set of one or more resources and the second set of one or more resources based on the indication. The operations of 1920 may be performed in accordance with examples as disclosed herein. In some examples, aspects of the operations of 1920 may be performed by a shared channel communication component 1130 as described with reference to FIG. 11.

At 1925, the method may include transmitting, in one or more fields of second SCI over the sidelink control channel, the feedback message to the second wireless device. The operations of 1925 may be performed in accordance with examples as disclosed herein. In some examples, aspects of the operations of 1925 may be performed by a feedback component 1175 as described with reference to FIG. 11.

The following provides an overview of aspects of the present disclosure:

Aspect 1: A method for wireless communications at a first wireless device, comprising: receiving, from a second wireless device, first SCI comprising an allocation of a first set of one or more resources for a sidelink transmission from the second wireless device to the first wireless device and an indication that schedules a second set of one or more resources for one or more additional sidelink transmissions between the first wireless device and the second wireless device, wherein the one or more additional sidelink transmissions are scheduled to occur after the sidelink transmission from the second wireless device to the first wireless device; and communicating with the second wireless device via a sidelink shared channel using the first set of one or more resources and the second set of one or more resources based at least in part on the indication.

Aspect 2: The method of aspect 1, further comprising: receiving a control message allocating the second set of one or more resources for the one or more additional sidelink transmissions, the one or more additional sidelink transmissions comprising sidelink transmissions from the first wireless device to the second wireless device, or sidelink transmissions from the second wireless device to the first wireless device, or any combination thereof.

Aspect 3: The method of aspect 2, wherein each of the one or more additional sidelink transmissions scheduled by the first SCI is associated with a respective index value, the method further comprising: determining that a first sidelink transmission of the one or more additional sidelink transmissions is scheduled as a sidelink transmission from the first wireless device to the second wireless device based at least in part on a first index value associated with the first sidelink transmission; and determining that a second sidelink transmission of the one or more additional sidelink transmissions is scheduled as another sidelink transmission from the second wireless device to the first wireless device based at least in part on a second index value associated with the second sidelink transmission, the second index value being different from the first index value.

Aspect 4: The method of aspect 3, wherein the first index value comprises an even index value and the second index value comprises an odd index value, or vice versa.

Aspect 5: The method of any of aspects 2 through 4, further comprising: determining that the one or more additional sidelink transmissions each comprise the sidelink transmissions from the first wireless device to the second wireless device based at least in part on the control message.

Aspect 6: The method of any of aspects 1 through 5, further comprising: receiving, within the first SCI, a communication direction indicator of whether the one or more additional sidelink transmissions are scheduled as sidelink transmissions from the first wireless device to the second wireless device or sidelink transmissions from the second wireless device to the first wireless device; and determining that the one or more additional sidelink transmissions comprise the sidelink transmissions from the first wireless device to the second wireless device, or the sidelink transmissions from the second wireless device to the first wireless device, or any combination thereof, based at least in part on the communication direction indicator.

Aspect 7: The method of any of aspects 1 through 6, further comprising: receiving second SCI from the second wireless device based at least in part on the first SCI, wherein the first SCI, or the second SCI, or any combination thereof, has CRC bits scrambled with a reverse sidelink RNTI; and determining that the one or more additional sidelink transmissions each comprise sidelink transmissions from the first wireless device to the second wireless device based at least in part on the reverse sidelink RNTI.

Aspect 8: The method of any of aspects 1 through 7, further comprising: receiving second SCI from the second wireless device based at least in part on the first SCI, wherein the first SCI, or the second SCI, or any combination thereof, has CRC bits scrambled with an alternate sidelink RNTI that is common to alternating sidelink transmissions; and determining that the one or more additional sidelink transmissions are scheduled to alternate between the sidelink transmissions from the first wireless device to the second wireless device and sidelink transmissions from the second wireless device to the first wireless device based at least in part on the alternate sidelink RNTI.

Aspect 9: The method of any of aspects 1 through 8, further comprising: receiving second SCI from the second wireless device based at least in part on the first SCI, wherein respective bits in the second SCI correspond to either sidelink transmissions from the first wireless device to the second wireless device or sidelink transmissions from the second wireless device to the first wireless device, and wherein a number of the respective bits corresponds to a number of the one or more additional sidelink transmissions.

Aspect 10: The method of any of aspects 1 through 9, further comprising: receiving, within the first SCI or second SCI associated with the first SCI, a retransmission indicator associated with one or more retransmissions from the first wireless device to the second wireless device; identifying a retransmission request based at least in part on the retransmission indicator indicating a request to transmit the one or more retransmissions to the second wireless device; and transmitting the one or more retransmissions using the second set of one or more resources based at least in part on the retransmission request.

Aspect 11: The method of aspect 10, wherein the retransmission indicator comprises a first bit in the first SCI, a second bit in the second SCI, an implicit indication in a time and frequency resource allocation field of the first SCI, or any combination thereof.

Aspect 12: The method of any of aspects 1 through 11, further comprising: receiving control signaling indicating one or more partitions for the first set of one or more resources and the second set of one or more resources, the one or more partitions comprising uniform partitions within a transmission time interval, or non-uniform partitions within the transmission time interval, or any combination thereof, wherein each partition of the one or more partitions is associated with respective SCI transmissions.

Aspect 13: The method of any of aspects 1 through 12, wherein the first SCI is associated with a partition of a transmission time interval, and wherein the one or more additional sidelink transmissions are scheduled within partitions of one or more transmission time intervals, the method further comprising: receiving, within the first SCI, a time indicator that indicates a respective time offset between each of the one or more additional sidelink transmissions, the respective time offset comprising a quantity of mini-slots, or a quantity of symbol periods, or any combination thereof; and receiving, within the first SCI, a frequency indicator that indicates a respective frequency offset between sequential sidelink transmissions of the one or more additional sidelink transmissions.

Aspect 14: The method of any of aspects 1 through 13, further comprising: identifying a RB bundling indicator indicating one or more sidelink shared channels within a transmission time interval to use for retransmissions from the first wireless device to the second wireless device, wherein the RB bundling indicator is configured, or comprises a first bitmap included in the first SCI, or a second bitmap included in second SCI, or any combination thereof; and mapping one or more sidelink transmissions from the first wireless device to the second wireless device to one or more sets of RBs in the transmission time interval based at least in part on the RB bundling indicator.

Aspect 15: The method of aspect 14, wherein the RB bundling indicator further indicates a number of resources of the second set of one or more resources in a same mini-slot that are bundled together for transmissions in a frequency domain.

Aspect 16: The method of any of aspects 14 through 15, wherein the RB bundling indicator further indicates transmission time interval bundling in which a number of resources of the second set of one or more resources occupy a same subchannel and span a threshold number of RBs that are bundled together in a same mini-slot.

Aspect 17: The method of any of aspects 14 through 16, further comprising: applying the RB bundling indicator with an additional indicator for identifying a number of repetitions of bundled consecutive RBs in a mini-slot; and transmitting, based at least in part on the RB bundling indicator and the additional indicator, a number of repetitions of the bundled consecutive RBs that are allocated for sidelink transmission from the first wireless device to the second wireless device in a time domain, a frequency domain, or both.

Aspect 18: The method of any of aspects 14 through 17, further comprising: mapping sidelink transmissions from the first wireless device to the second wireless device to a gap symbols between sets of consecutive RBs in a mini-slot based at least in part on the RB bundling indicator.

Aspect 19: The method of any of aspects 1 through 18, further comprising: receiving, from the second wireless device, a first sidelink message on the first set of one or more resources, wherein the first sidelink message is received over at least one mini-slot; generating a feedback message based at least in part on decoding the first sidelink message from the second wireless device; and transmitting, in one or more fields of second SCI over the sidelink control channel, the feedback message to the second wireless device.

Aspect 20: The method of aspect 19, wherein the feedback message comprises a plurality of bits corresponding to a request for additional resources for one or more retransmissions, or an initial transmission, or any combination thereof, of a sidelink message from the second wireless device to the first wireless device.

Aspect 21: The method of any of aspects 19 through 20, wherein the first sidelink message spans a plurality of mini-slots, and wherein the feedback message comprises a concatenation of a plurality of bits that each correspond to an acknowledgement or negative acknowledgement of the first sidelink message for each mini-slot of the plurality of mini-slots; or the feedback message comprises combined feedback for the plurality of mini-slots corresponding to the acknowledgement or the negative acknowledgement of the first sidelink message.

Aspect 22: The method of any of aspects 19 through 21, further comprising: identifying an absence of sidelink data to transmit in the second SCI; and transmitting the feedback message within the second SCI comprising one or more padding bits, a no-data indicator, or both, based at least in part on the absence of sidelink data.

Aspect 23: The method of any of aspects 19 through 22, wherein the one or more fields of the second SCI comprises a FDRA, a TDRA, or any combination thereof.

Aspect 24: The method of any of aspects 19 through 23, further comprising: transmitting a feedback indicator within the second SCI based at least in part on generating the feedback message, the feedback indicator indicating an absence of a resource reservation in the second SCI and that the one or more fields of the second SCI include the feedback message.

Aspect 25: The method of aspect 24, further comprising: scrambling a plurality of CRC bits of the second SCI using a RNTI associated with a replacement of a resource assignment with feedback, the RNTI being common among a plurality of wireless devices including the first wireless device, and wherein the RNTI comprises the feedback indicator.

Aspect 26: The method of any of aspects 24 through 25, wherein. the feedback indicator comprises a first bit present in at least one of the one or more fields of the second SCI, and a remaining number of bits in each of the one or more fields are associated with allocating sets of one or more resources for subsequent sidelink transmissions, one or more additional feedback messages, or any combination thereof.

Aspect 27: An apparatus for wireless communications at a first wireless device, comprising a processor; memory coupled with the processor; and instructions stored in the memory and executable by the processor to cause the apparatus to perform a method of any of aspects 1 through 26.

Aspect 28: An apparatus for wireless communications at a first wireless device, comprising at least one means for performing a method of any of aspects 1 through 26.

Aspect 29: A non-transitory computer-readable medium storing code for wireless communications at a first wireless device, the code comprising instructions executable by a processor to perform a method of any of aspects 1 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first wireless device, comprising:
    at least one processor;
    at least one memory coupled with the at least one processor; and
    instructions stored in the at least one memory and executable by the at least one processor to cause the apparatus to:
        receive, from a second wireless device, first sidelink control information comprising an allocation of a first set of one or more resources for a sidelink transmission from the second wireless device to the first wireless device, an indication that schedules a second set of one or more resources for one or more additional sidelink transmissions between the first wireless device and the second wireless device, and a resource block bundling indicator, wherein the one or more additional sidelink transmissions are scheduled to occur after the sidelink transmission from the second wireless device to the first wireless device, and wherein the resource block bundling indicator indicates at least one of:

a number of resources of the second set of one or more resources in a same mini-slot that are bundled together for transmissions in a frequency domain, or transmission time interval bundling in which a number of resources of the second set of one or more resources occupy a same subchannel and span a threshold number of resource blocks that are bundled together in a same mini-slot; and communicate with the second wireless device via a sidelink shared channel using the first set of one or more resources and the second set of one or more resources based at least in part on the indication and the resource block bundling indicator.

2. The apparatus of claim 1, wherein the instructions are further executable by the at least one processor to cause the apparatus to:

receive a control message allocating the second set of one or more resources for the one or more additional sidelink transmissions, the one or more additional sidelink transmissions comprising sidelink transmissions from the first wireless device to the second wireless device, or sidelink transmissions from the second wireless device to the first wireless device, or any combination thereof.

3. The apparatus of claim 2, wherein each of the one or more additional sidelink transmissions scheduled by the first sidelink control information is associated with a respective index value, and the instructions are further executable by the at least one processor to cause the apparatus to:

determine that a first sidelink transmission of the one or more additional sidelink transmissions is scheduled as a sidelink transmission from the first wireless device to the second wireless device based at least in part on a first index value associated with the first sidelink transmission; and determine that a second sidelink transmission of the one or more additional sidelink transmissions is scheduled as another sidelink transmission from the second wireless device to the first wireless device based at least in part on a second index value associated with the second sidelink transmission, the second index value being different from the first index value.

4. The apparatus of claim 3, wherein the first index value comprises an even index value and the second index value comprises an odd index value, or vice versa.

5. The apparatus of claim 2, wherein the instructions are further executable by the at least one processor to cause the apparatus to:

determine that the one or more additional sidelink transmissions each comprise the sidelink transmissions from the first wireless device to the second wireless device based at least in part on the control message.

6. The apparatus of claim 1, wherein the instructions are further executable by the at least one processor to cause the apparatus to:

receive, within the first sidelink control information, a communication direction indicator of whether the one or more additional sidelink transmissions are scheduled as sidelink transmissions from the first wireless device to the second wireless device or sidelink transmissions from the second wireless device to the first wireless device; and determine that the one or more additional sidelink transmissions comprise the sidelink transmissions from the first wireless device to the second wireless device, or the sidelink transmissions from the second wireless device to the first wireless device, or any combination thereof, based at least in part on the communication direction indicator.

7. The apparatus of claim 1, wherein the instructions are further executable by the at least one processor to cause the apparatus to:

receive second sidelink control information from the second wireless device based at least in part on the first sidelink control information, wherein the first sidelink control information, or the second sidelink control information, or any combination thereof, has cyclic redundancy check bits scrambled with a reverse sidelink radio network temporary identifier; and determine that the one or more additional sidelink transmissions each comprise sidelink transmissions from the first wireless device to the second wireless device based at least in part on the reverse sidelink radio network temporary identifier.

8. The apparatus of claim 1, wherein the instructions are further executable by the at least one processor to cause the apparatus to:

receive second sidelink control information from the second wireless device based at least in part on the first sidelink control information, wherein the first sidelink control information, or the second sidelink control information, or any combination thereof, has cyclic redundancy check bits scrambled with an alternate sidelink radio network temporary identifier that is common to alternating sidelink transmissions; and determine that the one or more additional sidelink transmissions are scheduled to alternate between the sidelink transmissions from the first wireless device to the second wireless device and sidelink transmissions from the second wireless device to the first wireless device based at least in part on the alternate sidelink radio network temporary identifier.

9. The apparatus of claim 1, wherein the instructions are further executable by the at least one processor to cause the apparatus to:

receive second sidelink control information from the second wireless device based at least in part on the first sidelink control information, wherein respective bits in the second sidelink control information correspond to either sidelink transmissions from the first wireless device to the second wireless device or sidelink transmissions from the second wireless device to the first wireless device, and wherein a number of the respective bits corresponds to a number of the one or more additional sidelink transmissions.

10. The apparatus of claim 1, wherein the instructions are further executable by the at least one processor to cause the apparatus to:

receive, within the first sidelink control information or second sidelink control information associated with the first sidelink control information, a retransmission indicator associated with one or more retransmissions from the first wireless device to the second wireless device;

identify a retransmission request based at least in part on the retransmission indicator indicating a request to transmit the one or more retransmissions to the second wireless device; and transmit the one or more retransmissions using the second set of one or more resources based at least in part on the retransmission request.

11. The apparatus of claim 10, wherein the retransmission indicator comprises a first bit in the first sidelink control information, a second bit in the second sidelink control information, an implicit indication in a time and frequency resource allocation field of the first sidelink control information, or any combination thereof.

12. The apparatus of claim 1, wherein the instructions are further executable by the at least one processor to cause the apparatus to:
receive control signaling indicating one or more partitions for the first set of one or more resources and the second set of one or more resources, the one or more partitions comprising uniform partitions within a transmission time interval, or non-uniform partitions within the transmission time interval, or any combination thereof, wherein each partition of the one or more partitions is associated with respective sidelink control information transmissions.

13. The apparatus of claim 1, wherein the first sidelink control information is associated with a partition of a transmission time interval, and the instructions are further executable by the at least one processor to cause the apparatus to:
receive, within the first sidelink control information, a time indicator that indicates a respective time offset between each of the one or more additional sidelink transmissions, the respective time offset comprising a quantity of mini-slots, or a quantity of symbol periods, or any combination thereof and receive, within the first sidelink control information, a frequency indicator that indicates a respective frequency offset between sequential sidelink transmissions of the one or more additional sidelink transmissions.

14. The apparatus of claim 1,
wherein the resource block bundling indicator indicates one or more sidelink shared channels within a transmission time interval to use for retransmissions from the first wireless device to the second wireless device, wherein the resource block bundling indicator is configured, or comprises a first bitmap included in the first sidelink control information, or a second bitmap included in second sidelink control information, or any combination thereof; and
wherein the instructions are further executable by the at least one processor to cause the apparatus to:
map one or more sidelink transmissions from the first wireless device to the second wireless device to one or more sets of resource blocks in the transmission time interval based at least in part on the resource block bundling indicator.

15. The apparatus of claim 14, wherein the resource block bundling indicator indicates the number of resources of the second set of one or more resources in the same mini-slot that are bundled together for transmissions in the frequency domain.

16. The apparatus of claim 14, wherein the resource block bundling indicator indicates the transmission time interval bundling in which the number of resources of the second set of one or more resources occupy the same subchannel and span the threshold number of resource blocks that are bundled together in the same mini-slot.

17. The apparatus of claim 14, wherein the instructions are further executable by the at least one processor to cause the apparatus to:
apply the resource block bundling indicator with an additional indicator for identifying a number of repetitions of bundled consecutive resource blocks in a mini-slot; and
transmit, based at least in part on the resource block bundling indicator and the additional indicator, a number of repetitions of the bundled consecutive resource blocks that are allocated for sidelink transmission from the first wireless device to the second wireless device in a time domain, a frequency domain, or both.

18. The apparatus of claim 14, wherein the instructions are further executable by the at least one processor to cause the apparatus to:
map sidelink transmissions from the first wireless device to the second wireless device to a gap symbols between sets of consecutive resource blocks in a mini-slot based at least in part on the resource block bundling indicator.

19. The apparatus of claim 1, wherein the instructions are further executable by the at least one processor to cause the apparatus to:
receive, from the second wireless device, a first sidelink message on the first set of one or more resources, wherein the first sidelink message is received over at least one mini-slot;
generate a feedback message based at least in part on decoding the first sidelink message from the second wireless device; and
transmit, in one or more fields of second sidelink control information over the sidelink control channel, the feedback message to the second wireless device.

20. The apparatus of claim 19, wherein the feedback message comprises a plurality of bits corresponding to a request for additional resources for one or more retransmissions, or an initial transmission, or any combination thereof, of a sidelink message from the second wireless device to the first wireless device.

21. The apparatus of claim 19, wherein:
the feedback message comprises a concatenation of a plurality of bits that each correspond to an acknowledgement or negative acknowledgement of the first sidelink message for each mini-slot of the plurality of mini-slots; or
the feedback message comprises combined feedback for the plurality of mini-slots corresponding to the acknowledgement or the negative acknowledgement of the first sidelink message.

22. The apparatus of claim 19, wherein the instructions are further executable by the at least one processor to cause the apparatus to:
identify an absence of sidelink data to transmit in the second sidelink control information; and
transmit the feedback message within the second sidelink control information comprising one or more padding bits, a no-data indicator, or both, based at least in part on the absence of sidelink data.

23. The apparatus of claim 19, wherein the one or more fields of the second sidelink control information comprises a frequency domain resource allocation field, a time domain resource allocation field, or any combination thereof.

24. The apparatus of claim 19, wherein the instructions are further executable by the at least one processor to cause the apparatus to:
transmit a feedback indicator within the second sidelink control information based at least in part on generating the feedback message, the feedback indicator indicating an absence of a resource reservation in the second sidelink control information and that the one or more fields of the second sidelink control information include the feedback message.

25. The apparatus of claim 24, wherein the instructions are further executable by the at least one processor to cause the apparatus to:

scramble a plurality of cyclic redundancy check bits of the second sidelink control information using a radio network temporary identifier associated with a replacement of a resource assignment with feedback, the radio network temporary identifier being common among a plurality of wireless devices including the first wireless device, and wherein the radio network temporary identifier comprises the feedback indicator.

26. The apparatus of claim 24, wherein:
the feedback indicator comprises a first bit present in at least one of the one or more fields of the second sidelink control information, and
a remaining number of bits in each of the one or more fields are associated with allocating sets of one or more resources for subsequent sidelink transmissions, one or more additional feedback messages, or any combination thereof.

27. A method for wireless communications at a first wireless device, comprising:
receiving, from a second wireless device, first sidelink control information comprising an allocation of a first set of one or more resources for a sidelink transmission from the second wireless device to the first wireless device, an indication that schedules a second set of one or more resources for one or more additional sidelink transmissions between the first wireless device and the second wireless device, and a resource block bundling indicator, wherein the one or more additional sidelink transmissions are scheduled to occur after the sidelink transmission from the second wireless device to the first wireless device, and wherein the resource block bundling indicator indicates at least one of:
a number of resources of the second set of one or more resources in a same mini-slot that are bundled together for transmissions in a frequency domain, or
transmission time interval bundling in which a number of resources of the second set of one or more resources occupy a same subchannel and span a threshold number of resource blocks that are bundled together in a same mini-slot; and
communicating with the second wireless device via a sidelink shared channel using the first set of one or more resources and the second set of one or more resources based at least in part on the indication and the resource block bundling indicator.

28. The method of claim 27, further comprising:
receiving a control message allocating the second set of one or more resources for the one or more additional sidelink transmissions, the one or more additional sidelink transmissions comprising sidelink transmissions from the first wireless device to the second wireless device, or sidelink transmissions from the second wireless device to the first wireless device, or any combination thereof.

29. An apparatus for wireless communications at a first wireless device, comprising:
means for receiving, from a second wireless device, first sidelink control information comprising an allocation of a first set of one or more resources for a sidelink transmission from the second wireless device to the first wireless device, an indication that schedules a second set of one or more resources for one or more additional sidelink transmissions between the first wireless device and the second wireless device, and a resource block bundling indicator, wherein the one or more additional sidelink transmissions are scheduled to occur after the sidelink transmission from the second wireless device to the first wireless device, and wherein the resource block bundling indicator indicates at least one of:
a number of resources of the second set of one or more resources in a same mini-slot that are bundled together for transmissions in a frequency domain, or
transmission time interval bundling in which a number of resources of the second set of one or more resources occupy a same subchannel and span a threshold number of resource blocks that are bundled together in a same mini-slot; and
means for communicating with the second wireless device via a sidelink shared channel using the first set of one or more resources and the second set of one or more resources based at least in part on the indication and the resource block bundling indicator.

30. A non-transitory computer-readable medium storing code for wireless communications at a first wireless device, the code comprising instructions executable by at least one processor to:
receive, from a second wireless device, first sidelink control information comprising an allocation of a first set of one or more resources for a sidelink transmission from the second wireless device to the first wireless device, an indication that schedules a second set of one or more resources for one or more additional sidelink transmissions between the first wireless device and the second wireless device, and a resource block bundling indicator, wherein the one or more additional sidelink transmissions are scheduled to occur after the sidelink transmission from the second wireless device to the first wireless device, and wherein the resource block bundling indicator indicates at least one of:
a number of resources of the second set of one or more resources in a same mini-slot that are bundled together for transmissions in a frequency domain, or
transmission time interval bundling in which a number of resources of the second set of one or more resources occupy a same subchannel and span a threshold number of resource blocks that are bundled together in a same mini-slot; and
communicate with the second wireless device via a sidelink shared channel using the first set of one or more resources and the second set of one or more resources based at least in part on the indication and the resource block bundling indicator.

* * * * *